US010917619B2

(12) United States Patent
Uchida et al.

(10) Patent No.: US 10,917,619 B2
(45) Date of Patent: Feb. 9, 2021

(54) DISPLAY APPARATUS, DISPLAY SYSTEM, MOVEABLE BODY, AND DISPLAY METHOD

(71) Applicant: KYOCERA Corporation, Kyoto (JP)

(72) Inventors: Eri Uchida, Yokohama (JP); Hiroyuki Minagawa, Yokohama (JP); Masaki Fujiwara, Yokohama (JP); Tomoya Sugita, Machida (JP); Keita Yasuda, Kawasaki (JP); Naoki Matsui, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 72 days.

(21) Appl. No.: 16/311,298

(22) PCT Filed: Jun. 20, 2017

(86) PCT No.: PCT/JP2017/022752
§ 371 (c)(1),
(2) Date: Dec. 19, 2018

(87) PCT Pub. No.: WO2017/221945
PCT Pub. Date: Dec. 28, 2017

(65) Prior Publication Data
US 2019/0191131 A1 Jun. 20, 2019

(30) Foreign Application Priority Data

Jun. 20, 2016 (JP) .................. 2016-122141
Jun. 20, 2016 (JP) .................. 2016-122143
Jun. 20, 2016 (JP) .................. 2016-122145

(51) Int. Cl.
*H04N 9/31* (2006.01)
*G03B 21/20* (2006.01)
(Continued)

(52) U.S. Cl.
CPC .............. *H04N 9/31* (2013.01); *B60R 11/04* (2013.01); *G02B 27/01* (2013.01);
(Continued)

(58) Field of Classification Search
CPC ................ G03B 21/14; G03B 21/2066; G03B 2027/0154; G03B 2027/0179; G02B 27/01; G02B 27/0101
(Continued)

(56) References Cited

U.S. PATENT DOCUMENTS 8,038,304 B2 10/2011 Mizuuchi et al.
8,558,758 B2 10/2013 Sato et al.
(Continued)

FOREIGN PATENT DOCUMENTS

JP H0761257 A 3/1995
JP 2006-162442 A 6/2006
(Continued)

*Primary Examiner* — William C. Dowling
(74) *Attorney, Agent, or Firm* — Studebaker & Brackett PC

(57) ABSTRACT

A display apparatus includes an image projector and a controller. The image projector emits image projection light that projects an image onto a projection-target surface. The controller controls, in a time division manner, the emission direction of the image projection light emitted by the image projector. The controller performs control to prevent the sum of the area of one or more regions of the projection-target surface, on which the image projection light is projected, from exceeding a predetermined upper limit.

22 Claims, 33 Drawing Sheets

(51) Int. Cl.
  *G02B 27/09* (2006.01)
  *H04N 5/66* (2006.01)
  *G02B 27/01* (2006.01)
  *G09G 3/02* (2006.01)
  *B60R 11/04* (2006.01)
  *H04N 13/30* (2018.01)
  *G09G 5/377* (2006.01)
  *G09G 5/38* (2006.01)
  *G06F 3/14* (2006.01)

(52) U.S. Cl.
  CPC ..... *G02B 27/0977* (2013.01); *G03B 21/2066* (2013.01); *G09G 3/02* (2013.01); *G09G 5/377* (2013.01); *G09G 5/38* (2013.01); *H04N 5/66* (2013.01); *H04N 13/30* (2018.05); *B60K 2370/334* (2019.05); *G06F 3/14* (2013.01); *G09G 2320/0626* (2013.01); *G09G 2320/0653* (2013.01); *G09G 2340/125* (2013.01); *G09G 2380/10* (2013.01)

(58) Field of Classification Search
  USPC .............................. 353/79, 46, 98
  See application file for complete search history.

(56) References Cited

U.S. PATENT DOCUMENTS

| | | | |
|---|---|---|---|
| 8,698,858 | B2 | 4/2014 | Kurozuka et al. |
| 9,639,990 | B2 | 5/2017 | Mochizuki et al. |
| 9,892,643 | B2 | 2/2018 | Aoki |
| 2009/0207322 | A1 | 8/2009 | Mizuuchi et al. |
| 2009/0208404 | A1 | 8/2009 | Itoh |
| 2010/0253593 | A1 | 10/2010 | Seder et al. |
| 2012/0050138 | A1 | 3/2012 | Sato et al. |
| 2012/0242724 | A1 | 9/2012 | Kurozuka et al. |
| 2014/0232763 | A1 | 8/2014 | Hada et al. |
| 2015/0062345 | A1 | 3/2015 | Kusanagi |
| 2015/0097866 | A1 | 4/2015 | Mochizuki et al. |
| 2016/0202482 | A1* | 7/2016 | Kuzuhara .......... G02B 27/0101 359/633 |
| 2016/0216521 | A1 | 7/2016 | Yachida et al. |
| 2016/0379498 | A1 | 12/2016 | Aoki |
| 2017/0158132 | A1 | 6/2017 | Sasano et al. |
| 2018/0120562 | A1* | 5/2018 | Yata .................. G02B 27/283 |
| 2019/0302454 | A1* | 10/2019 | Ohyama ............. G02B 17/086 |
| 2020/0064640 | A1* | 2/2020 | Nagano ............. G02B 27/0101 |
| 2020/0201054 | A1* | 6/2020 | Masuya .................. B60R 1/00 |

FOREIGN PATENT DOCUMENTS

| | | |
|---|---|---|
| JP | 2008-094377 A | 4/2008 |
| JP | 2009-251194 A | 10/2009 |
| JP | 2010-256878 A | 11/2010 |
| JP | 2012-078619 A | 4/2012 |
| JP | WO2012-046379 A1 | 2/2014 |
| JP | 2015-080988 A | 4/2015 |
| JP | 2015-092237 A | 5/2015 |
| JP | 2015-152834 A | 8/2015 |
| JP | 2015-168382 A | 9/2015 |
| JP | 2016 024420 A | 2/2016 |
| JP | 2016-024673 A | 2/2016 |
| WO | 2008-004428 A1 | 1/2008 |
| WO | 2008-004438 A1 | 1/2008 |

* cited by examiner

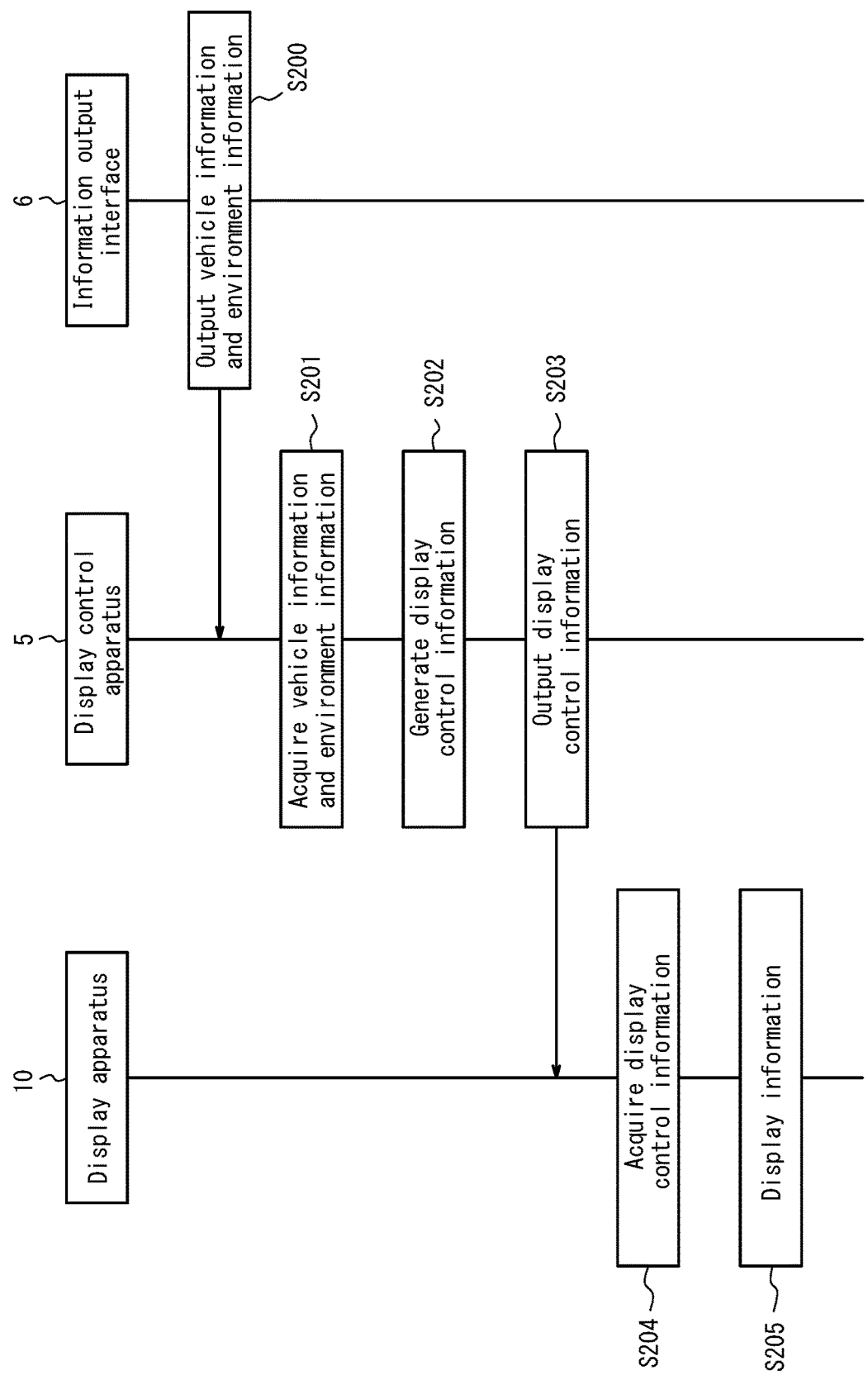

DISPLAY APPARATUS, DISPLAY SYSTEM, MOVEABLE BODY, AND DISPLAY METHOD

CROSS-REFERENCE TO RELATED APPLICATION

The present application claims priority to and the benefit of Japanese Patent Application Nos. 2016-122141, 2016-122143, and 2016-122145 filed Jun. 20, 2016, the entire contents of which are incorporated herein by reference.

TECHNICAL FIELD

Embodiments of the present disclosure relate to a display apparatus, a display system, a moveable body, and a display method.

BACKGROUND

A display apparatus that emits light onto the front windshield from the lower portion of the instrument panel of a vehicle to display an image with reflected light is known. For example, the display apparatus itself is moveable.

SUMMARY

A display apparatus according to an embodiment of the present disclosure includes an image projector configured to project image projection light that projects an image onto a projection-target surface. The display apparatus includes a controller that controls, in a time division manner, the emission direction of the image projection light emitted by the image projector. The controller performs control to prevent the sum of the area of one or more regions of the projection-target surface, on which the image projection light is projected, from exceeding a predetermined upper limit.

A display system according to an embodiment of the present disclosure includes a projection-target member that receives light and scatters the light or receives light and emits light. The display system includes an image projector configured to emit image projection light that projects an image and to form the image as a real image on the projection-target member. The display system includes a controller that controls, in a time division manner, the emission direction of the image projection light emitted by the image projector. The controller performs control to prevent the sum of the area of one or more regions of the projection-target member, on which the image projection light is projected, from exceeding a predetermined upper limit.

A display system according to an embodiment of the present disclosure includes a projection-target member that reflects at least a portion of light. The display system includes an image projector configured to emit image projection light that projects an image and to cause the image projection light to be reflected by one or more regions of the projection-target member to display the image as a virtual image in a field of view of a user. The display system includes a controller that controls, in a time division manner, the emission direction of the image projection light emitted by the image projector. The controller performs control to prevent the sum of the area of the one or more regions of the projection-target member, on which the image projection light is projected, from exceeding a predetermined upper limit.

A moveable body according to an embodiment of the present disclosure includes a display system. The display system includes a projection-target member that reflects at least a portion of light. The display system includes an image projector configured to emit image projection light that projects an image and to cause the image projection light to be reflected by one or more regions of the projection-target member to display the image as a virtual image in a field of view of a user. The display system includes a controller that controls, in a time division manner, the emission direction of the image projection light emitted by the image projector. The controller performs control to prevent the sum of the area of the one or more regions of the projection-target member, on which the image projection light is projected, from exceeding a predetermined upper limit. The projection-target member is provided on a windshield.

A moveable body according to an embodiment of the present disclosure includes a display system. The display system includes a projection-target member that receives light and scatters the light or receives light and emits light. The display system includes an image projector configured to emit image projection light that projects an image and to form the image as a real image on the projection-target member. The display system includes a controller that controls, in a time division manner, the emission direction of the image projection light emitted by the image projector. The controller performs control to prevent the sum of the area of one or more regions of the projection-target member, on which the image projection light is projected, from exceeding a predetermined upper limit. The projection-target member is provided on a windshield.

A display system according to an embodiment of the present disclosure is providable in a moveable body and includes a display control apparatus and a display apparatus. The display control apparatus generates control information on the basis of at least one of moveable body information related to the moveable body and environment information related to an environment of the moveable body. On the basis of the control information, the display apparatus causes a support image suggesting a path of the moveable body to be displayed within a field of view of a driver. The control information includes information for changing a display position of the support image.

A moveable body according to an embodiment of the present disclosure includes a display system including a display control apparatus and a display apparatus. The display control apparatus generates control information on the basis of at least one of moveable body information related to the moveable body and environment information related to an environment of the moveable body. On the basis of the control information, the display apparatus causes a support image suggesting a path of the moveable body to be displayed within a field of view of a driver. The control information includes information for changing a display position of the support image.

A display method according to an embodiment of the present disclosure uses a display system providable in a moveable body and includes generating control information on the basis of at least one of moveable body information related to the moveable body and environment information related to an environment of the moveable body and causing, on the basis of the control information, a support image suggesting a path of the moveable body to be displayed within a field of view of a driver. The control information includes information for changing a display position of the support image.

A display system according to an embodiment of the present disclosure is providable in a moveable body and includes a display control apparatus and a display apparatus. The display control apparatus generates control information on the basis of at least one of moveable body information related to the moveable body and environment information related to an environment of the moveable body. On the basis of the control information, the display apparatus causes a marker image suggesting the presence of a predetermined object in a field of view of a driver to be displayed within the field of view of the driver. The control information includes information for changing a display position of the marker image.

A moveable body according to an embodiment of the present disclosure includes a display system including a display control apparatus and a display apparatus. The display control apparatus generates control information on the basis of at least one of moveable body information related to the moveable body and environment information related to an environment of the moveable body. On the basis of the control information, the display apparatus causes a marker image suggesting presence of a predetermined object in a field of view of a driver to be displayed within the field of view of the driver. The control information includes information for changing a display position of the marker image.

A display method according to an embodiment of the present disclosure uses a display system providable in a moveable body and includes generating control information on the basis of at least one of moveable body information related to the moveable body and environment information related to an environment of the moveable body and causing, on the basis of the control information, a marker image suggesting the presence of a predetermined object in a field of view of a driver to be displayed within the field of view of the driver. The control information includes information for changing a display position of the marker image.

BRIEF DESCRIPTION OF THE DRAWINGS

In the accompanying drawings:

FIG. 49 is a flowchart illustrating operation of a display apparatus, a display control apparatus, and an information output interface.

DETAILED DESCRIPTION

Figure 1:
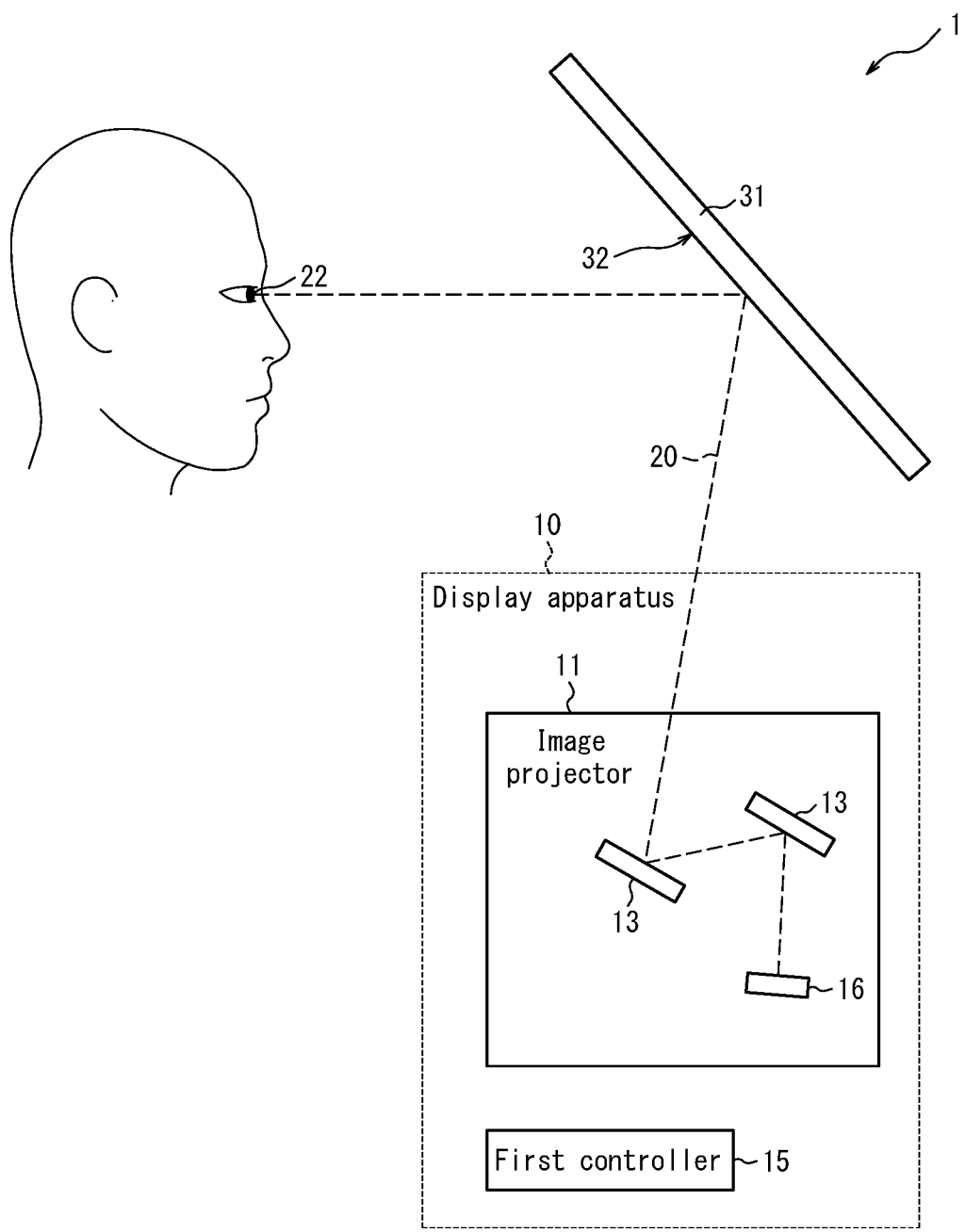
FIG. 1 illustrates an example configuration of a display apparatus according to an embodiment.

More convenient techniques for displaying an image in the field of view of a viewer through an optical member such as a front windshield are desired.

One such desired improvement in the convenience of the above-described techniques is expansion of the display region of an image. The display region could be expanded by, for example, moving the display apparatus in accordance with a change in the display position of the image. When the display apparatus is mounted in a vehicle, however, there is not always sufficient space for the display apparatus to be movable. For example, the space in which the display apparatus can move may be limited by other devices installed in the instrument panel of the vehicle. Another way to expand the display region could be to expand the angle of view over which the display apparatus projects an image. If the angle of view is relatively large, however, the brightness of the projected image may decrease. A dim image may not be sufficiently visible.

For example, an improvement in the convenience of the above-described techniques is also desired to provide a viewer with information in accordance with the circumstances of the vehicle in which the display apparatus is mounted.

A display apparatus, a display system, a moveable body, and a display method according to embodiments of the present disclosure improve the convenience of techniques for displaying an image in the field of view of a viewer through an optical member.

Embodiments

Various embodiments are described below in detail with reference to the drawings. The drawings referred to below are schematic illustrations. The dimensional ratios and the like in the drawings do not necessarily match the actual dimensions.

[System Configuration]

As illustrated in FIG. 1, a display system 1 according to the present embodiment includes a display apparatus 10 and a projection-target member 31 that has a projection-target surface 32. As described below, the constituent elements in the display system 1 are not limited to these elements. The display apparatus 10 includes an image projector 11 and a first controller 15. The display apparatus 10 emits image projection light 20, indicated by the dashed line, to project an image onto the projection-target surface 32. The image projected onto the projection-target surface 32 reaches the eyes 22 of the user of the display system 1. The image that reaches the eyes 22 can be considered to enter the user's field of view.

The image projector 11 may include an image generator 16, as illustrated in FIG. 1. In this case, the image projector 11 emits the image projection light 20 from the image generator 16 on the basis of control information from the first controller 15. The image projector 11 projects an image onto the projection-target surface 32.

The image generator 16 includes an image generation surface. The image generator 16 may generate an image on the image generation surface.

The image generator 16 may emit the image projection light 20 from the image generation surface.

The image generator 16 may include a liquid crystal device. Examples of the liquid crystal device include a transmissive liquid crystal device such as a liquid crystal display (LCD) and a reflective liquid crystal device such as liquid crystal on silicon (LCOS). In this case, the image generation surface may be a display surface of the liquid crystal device.

The image generator 16 may include a mirror device. Examples of the mirror device may include a digital mirror device (DMD), a micro electro mechanical systems (MEMS) mirror, and the like. In this case, the image generation surface may be an array surface of the mirror. The image generator 16 may further include a member that forms light emitted from the mirror device into an image. Examples of this member may include a screen, a lens array, and the like. In this case, the image generation surface may be a screen or may be the image formation surface of a lens array.

The image generator 16 may include a lamp, a light emission diode (LED), a laser, or the like as a light source. The light source may be used as a backlight of the liquid crystal display. The light source may be used for causing light to be incident on the mirror device.

The image generator 16 may include a light-emitting device. Examples of the light-emitting device include inorganic electro-luminescence (EL) and organic EL. In this case, the image generation surface may be a display surface of the light-emitting device. The image generator 16 need not include a light source other than the light-emitting device.

Figure 2:
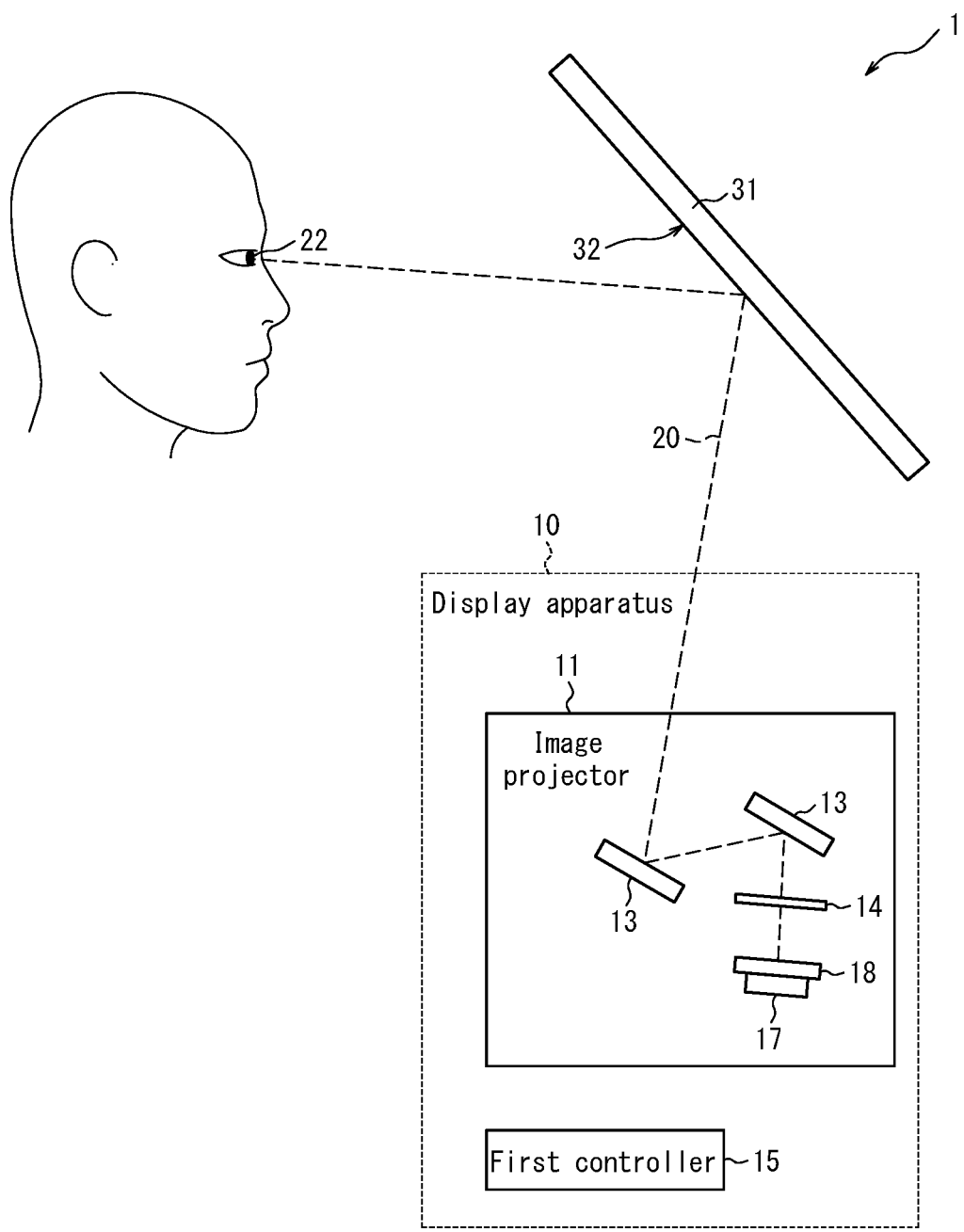
FIG. 2 illustrates an example configuration of a display apparatus that further includes an intermediate image plane.

The image projector 11 may include an intermediate image plane 14, a light source 17, and a scanning unit 18, as illustrated in FIG. 2. In this case, the image projector 11 controls the light source 17 and the scanning unit 18 on the basis of control information from the first controller 15. The image projector 11 forms an image on the image formation surface of the intermediate image plane 14. The image projector 11 emits the image projection light 20 from the image formation surface. The image projector 11 projects an image onto the projection-target surface 32.

The light source 17 may include a laser, for example. The light source 17 emits a light beam towards the intermediate image plane 14. The scanning unit 18 scans the light beam emitted from the light source 17. The scanning unit 18 may scan the light beam by driving the light source 17. The scanning unit 18 may scan the light beam emitted from the light source 17 by optically bending the travel direction of the light beam.

The intermediate image plane 14 may include a screen on which the light beam emitted from the light source 17 is formed into an image. In this case, the screen may be the image formation surface of the intermediate image plane 14. The intermediate image plane 14 may include a microlens array on which the light beam emitted from the light source 17 is formed into an image. In this case, the image formation surface of the microlens array may be the image formation surface of the intermediate image plane 14. The intermediate image plane 14 emits the image projection light 20 from the image formed on the image formation surface.

The image projector 11 may include a magnifying optical system 13, as illustrated in FIG. 1 and FIG. 2. The magnifying optical system 13 reflects or refracts the image projection light 20 emitted from the image generator 16 or the intermediate image plane 14. The magnifying optical system 13 projects the reflected or refracted image projection light 20 onto the projection-target surface 32. The magnifying optical system 13 may be a reflective optical system that includes convex or concave mirrors. The magnifying optical system 13 may be a refractive optical system that includes convex or concave lenses. The magnifying optical system 13 may be an optical system combining mirrors or lenses. The mirrors or lenses provided in the magnifying optical system 13 may have a spherical surface shape in at least a portion thereof. The mirrors or lenses provided in the magnifying optical system 13 may have an aspherical surface shape in at least a portion thereof. The mirrors or lenses provided in the magnifying optical system 13 may have a surface shape corresponding to the shape of the projection-target surface 32 in at least a portion thereof.

The first controller 15 controls the intensity and the like of the image projection light 20, emitted by the image projector 11, on the basis of data pertaining to the image to be displayed by the display apparatus 10 (display image data). The display image data may include characters, symbols, a photograph, or the like. The first controller 15 may generate the display image data on the basis of information acquired from an external apparatus. The first controller 15 may acquire the display image data from an external apparatus. The first controller 15 outputs control information to the image generator 16 for controlling the emission intensity or color of the light source, the orientation of the liquid crystals in the liquid crystal display, or the orientation of the mirrors in the mirror device, for example. The first controller 15 outputs control information for controlling the intensity of the light beam, for example, to the light source 17. The first controller 15 outputs control information for controlling the travel direction of the light beam, for example, to the scanning unit 18. The first controller 15 may include a processor, a microcomputer, or the like capable of executing application software.

The first controller 15 may include a memory device. Various information, programs for causing the components of the display apparatus 10 to operate, and the like may be stored in the memory device. The memory device may, for example, include a semiconductor memory. The memory device may function as a working memory of the first controller 15. The display apparatus 10 may include the memory device as a memory unit.

The first controller 15 acquires various information, display image data, or the like from an external apparatus. The first controller 15 may include a communication device. The communication device may, for example, be a communication interface for a local area network (LAN), a control area network (CAN), or the like. The communication device may be capable of communicating with an external apparatus in a wired or wireless manner. The display apparatus 10 may include the communication device as a communication interface.

At least a portion of the functions of the first controller 15 may be implemented by a separate control apparatus independent from the display apparatus 10.

When the direction in which the image projection light 20 is emitted from the image projector 11 is a constant direction, the projection position of the image on the projection-target surface 32 is a constant position. The direction in which the image projection light 20 is emitted is also referred to as the emission direction of the image projection light 20. The display apparatus 10 may change the emission direction of the image projection light 20 from the image projector 11. The display apparatus 10 may move the position at which the image projection light 20 is projected onto the projection-target surface 32.

Figure 3A:
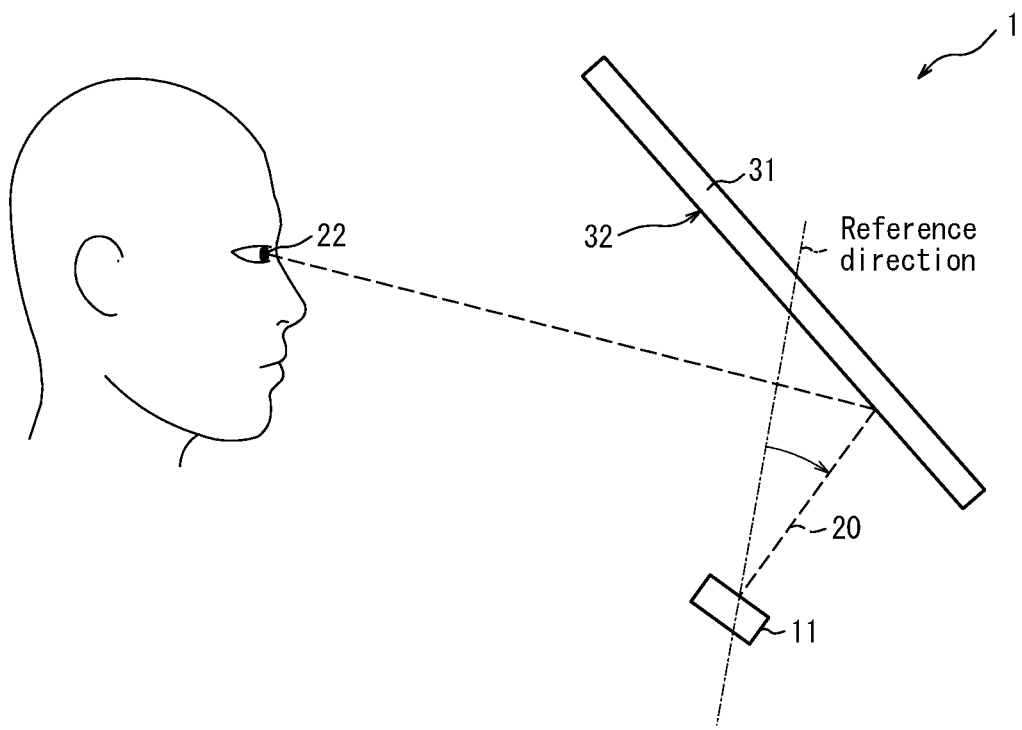
FIG. 3A illustrates an example of an image projection position corresponding to the emission direction of image projection light.
Figure 3B:
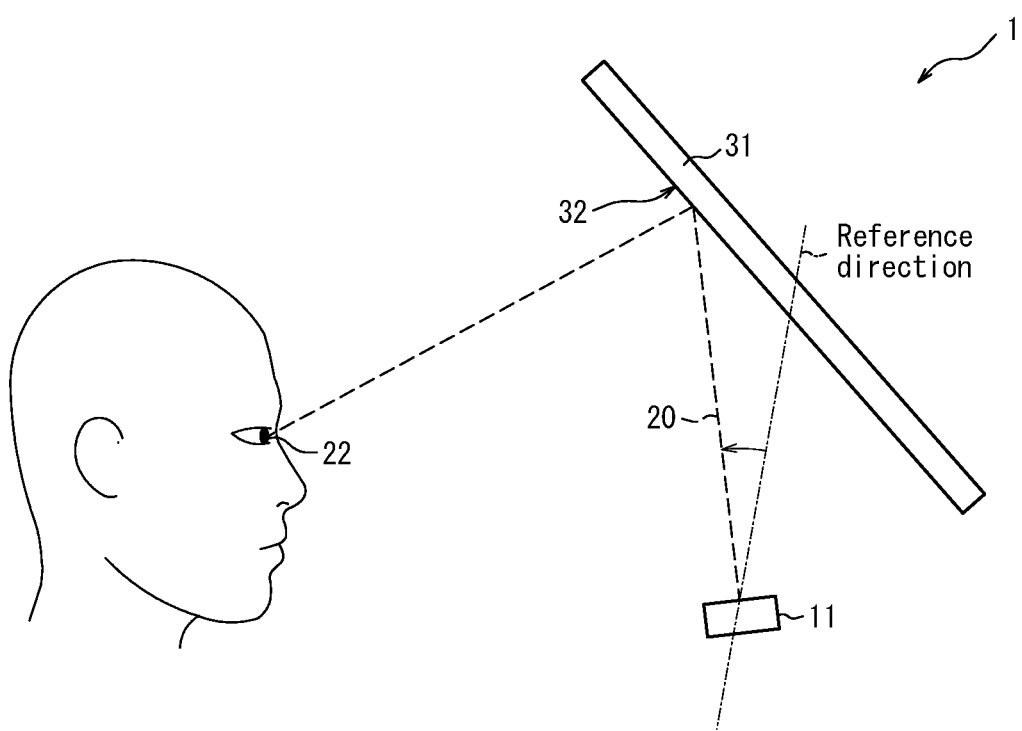
FIG. 3B illustrates an example of an image projection position corresponding to the emission direction of image projection light.

As illustrated in FIG. 3A, for example, the display apparatus 10 may change the emission direction of the image projection light 20 indicated by the dashed line in the clockwise direction from a reference direction indicated by the dashed dotted line. The reference direction corresponds to the emission direction of the image projection light 20 in the example in FIG. 1. In FIG. 3A, the image projection light 20 reaches the eyes 22 from a lower position than in FIG. 1. As a result of this image projection light 20, an image appears to be projected further towards the bottom of the projection-target surface 32. As illustrated in FIG. 3B, for example, the display apparatus 10 may change the emission direction of the image projection light 20, indicated by the dashed line, in the counterclockwise direction from the emission direction of the image projection light 20 in FIG. 1, indicated by the dashed dotted line. In FIG. 3B, the image projection light 20 reaches the eyes 22 from a higher position than in FIG. 1. As a result of this image projection light 20, an image appears to be projected further towards the top of the projection-target surface 32.

When the image generator 16 includes a device having a self-driving function, such as a MEMS mirror, then the first controller 15 may output control information to the image generator 16 for changing the emission direction of the image projection light 20.

Figure 4:
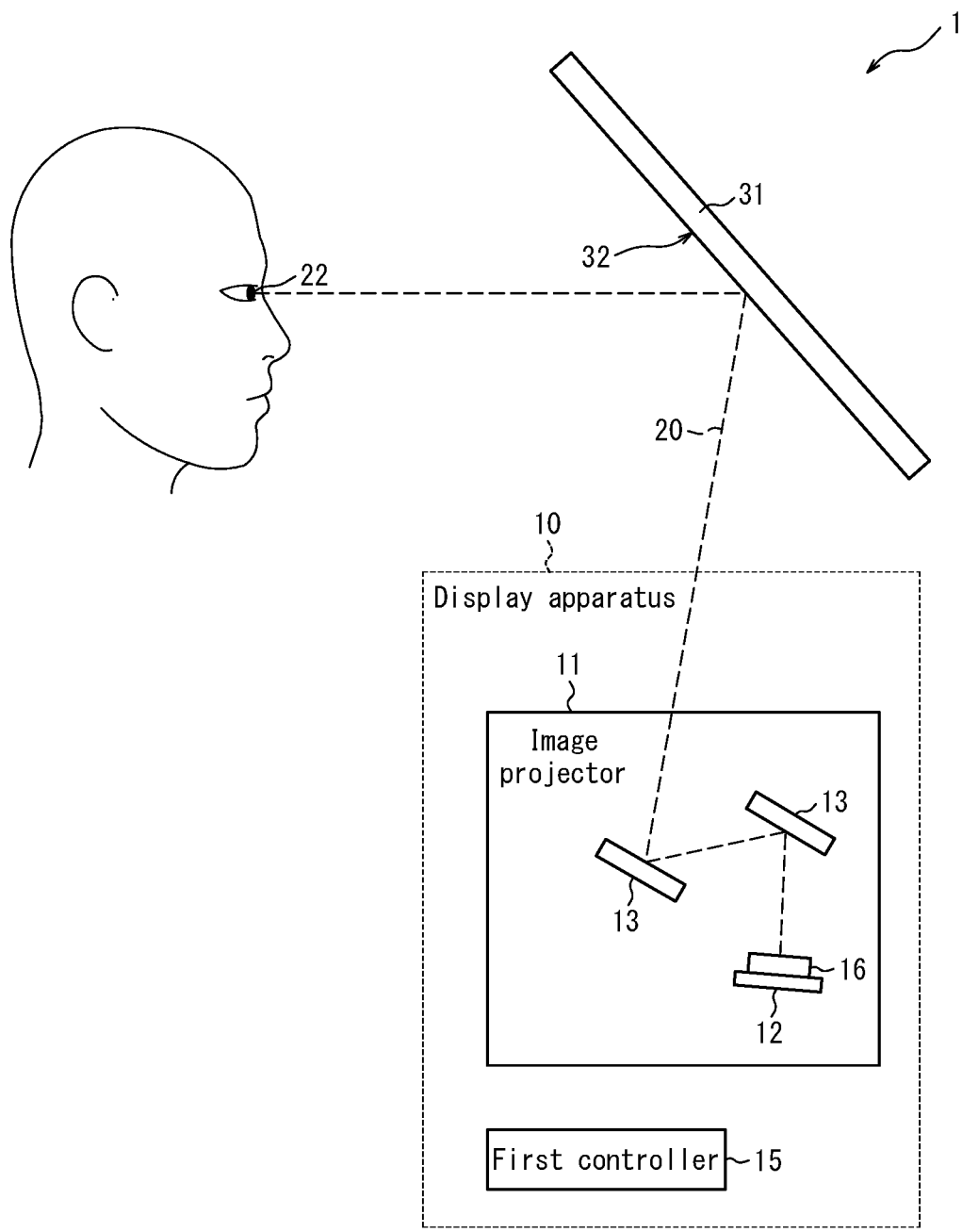
FIG. 4 illustrates an example configuration of a display apparatus that further includes a drive unit.
Figure 5:
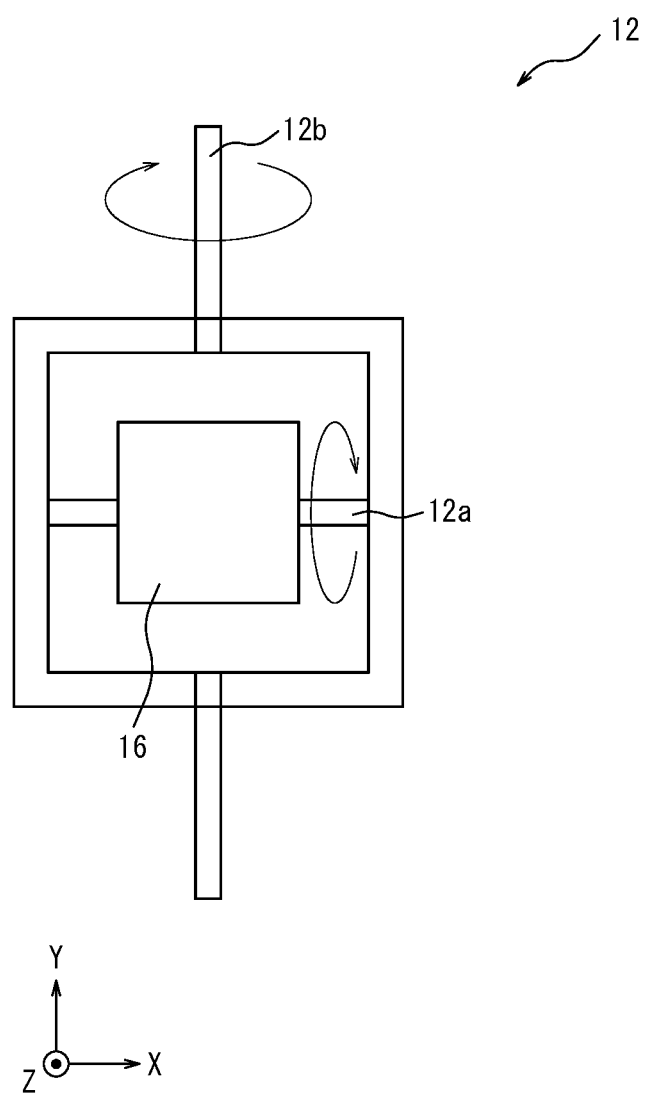
FIG. 5 illustrates an example configuration of the drive unit.

The display apparatus 10 may further include a drive unit 12, as illustrated in FIG. 4. The drive unit 12 may drive the image generator 16. The drive unit 12 can change the orientation of the image generation surface of the image generator 16. The drive unit 12 includes a first rotation axis 12a parallel to the x-axis and a second rotation axis 12b parallel to the y-axis, as illustrated in FIG. 5, for example. When not driving the image generator 16, the drive unit 12 may hold the image generator 16 to orient the image generation surface in the reference direction. In the example in FIG. 5, the reference direction is the z-axis direction. The reference direction is not limited to the z-axis direction and may be a different direction. The first rotation axis 12a and the second rotation axis 12b need not be parallel to the x-axis and y-axis and may lie along other directions. The drive unit 12 may instead include only one rotation axis or may include three or more rotation axes. In addition to causing rotational displacement around the rotation axis, the drive unit 12 may also cause displacement in another direction, such as a translation direction.

In the example in FIG. 5, the orientation of the image generation surface is controlled by the rotational displacement of the drive unit 12 about each of the first rotation axis 12a and the second rotation axis 12b. The drive unit 12 controls the rotational displacement about each of the first rotation axis 12a and the second rotation axis 12b using a motor or a piezoelectric element, for example. The drive unit 12 may control the rotational displacement about the rotation axes using other driving means. The first controller 15 may output control information to the drive unit 12 for producing rotational displacement about the rotation axes. The first controller 15 can change the emission direction of the image projection light 20. The drive unit 12 may control the displacement in another direction, such as a translation direction, using a motor, a piezoelectric element, or other driving means. The drive unit 12 can change the relative positions of the image generator 16 and the magnifying optical system 13.

When the display apparatus 10 includes the intermediate image plane 14, the drive unit 12 may hold the intermediate image plane 14. The drive unit 12 may drive the intermediate image plane 14. The drive unit 12 can change the orientation of the image formation surface of the intermediate image plane 14. The drive unit 12 may hold the intermediate image plane 14 to orient the image formation surface in the reference direction. The drive unit 12 may further hold the light source 17 or the scanning unit 18. The drive unit 12 may drive the light source 17 or the scanning unit 18 in conjunction with the intermediate image plane 14.

Figure 6:
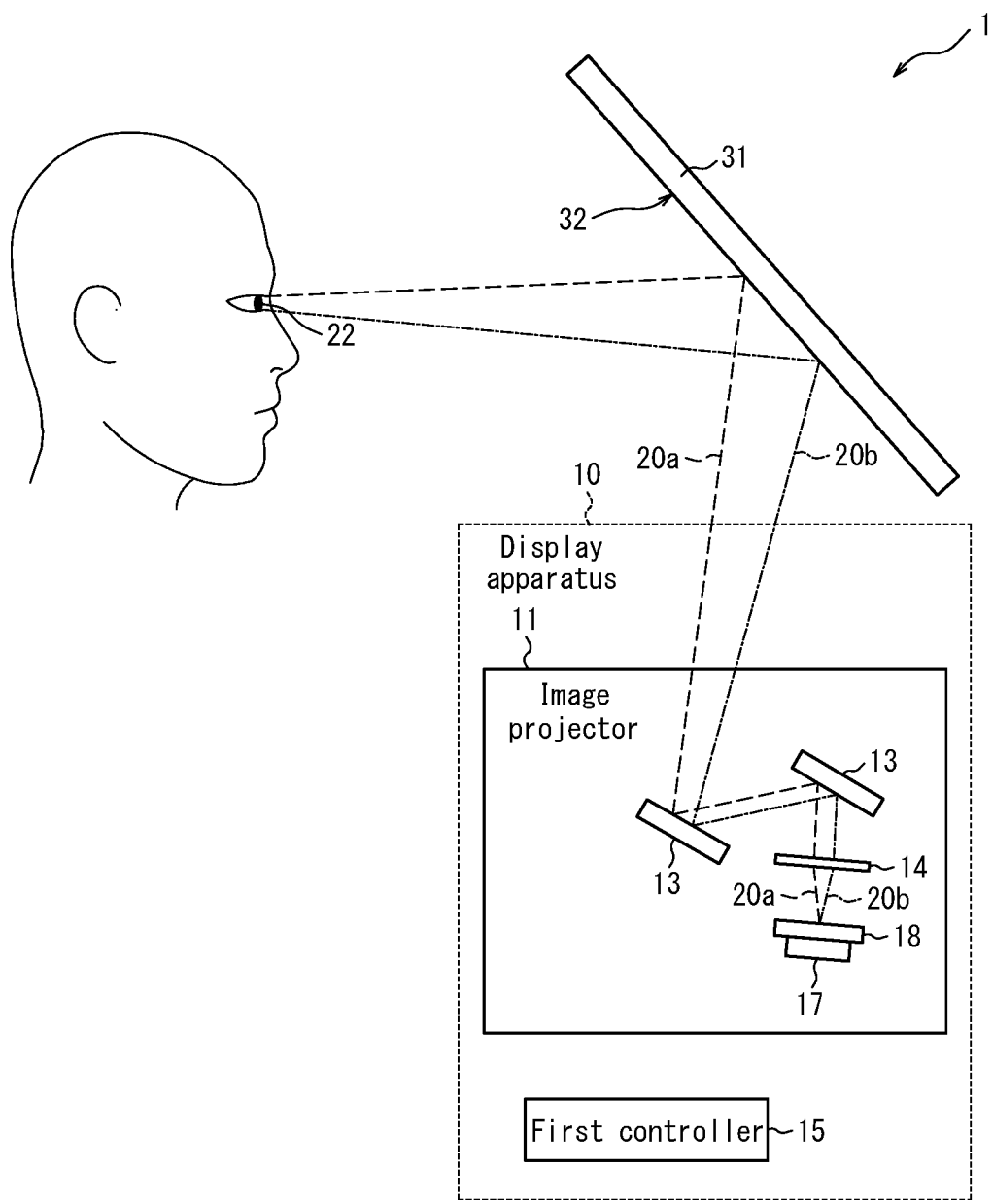
FIG. 6 illustrates an example of image projection light projected from an image formed on the intermediate image plane.

In the case illustrated in FIG. 2, the display apparatus 10 includes the intermediate image plane 14, the light source 17, and the scanning unit 18, but not the drive unit 12. The first controller 15 may output control information to the scanning unit 18 for controlling the image formation position of an image on the image formation surface of the intermediate image plane 14. The scanning unit 18 may bend the image projection light 20 as illustrated in FIG. 6, for example. The scanning unit 18 may change the emission direction of the image projection light 20 to the direction of a first optical path 20a, indicated by the dashed line. The image projection light 20 that traverses the first optical path 20a forms an image on the left side of the intermediate image plane 14 in FIG. 6. The image projection light 20 that traverses the first optical path 20a is projected through the magnifying optical system 13 relatively towards the top of the projection-target surface 32. The left side of the intermediate image plane 14 in FIG. 6 is the near side from the perspective of the user of the display apparatus 10. The scanning unit 18 may change the emission direction of the image projection light 20 to the direction of a second optical path 20b, indicated by the dashed dotted line. The image projection light 20 that traverses the second optical path 20b forms an image on the right side of the intermediate image plane 14 in FIG. 6. The image projection light 20 that traverses the second optical path 20b is projected through the magnifying optical system 13 relatively towards the bottom of the projection-target surface 32. The right side of the intermediate image plane 14 in FIG. 6 is the far side from the perspective of the user of the display apparatus 10. The intermediate image plane 14 may have a wider image formation surface to expand the range over which the scanning unit 18 scans the image projection light 20.

The case of the display apparatus 10 including the intermediate image plane 14, the light source 17, and the scanning unit 18 is described. The drive unit 12 need not hold the intermediate image plane 14. The drive unit 12 may hold the light source 17 and the scanning unit 18. The drive unit 12 may drive the light source 17 and the scanning unit 18. The drive unit 12 may control the image formation position of an image on the image formation surface of the intermediate image plane 14.

The display apparatus 10 may displace the lenses or the mirrors included in the magnifying optical system 13. The display apparatus 10 may change the emission direction of the image projection light 20. This configuration can further facilitate a change in the emission direction of the image projection light 20. When the optical axes of the lenses or mirrors are aligned, individual displacement of the lenses or mirrors may prevent light from forming an image at the desired position. To address this issue, the display apparatus 10 may displace the lenses or mirrors included in the magnifying optical system 13 in tandem to prevent the optical axes of the lenses or mirrors from becoming misaligned.

Figure 7A:
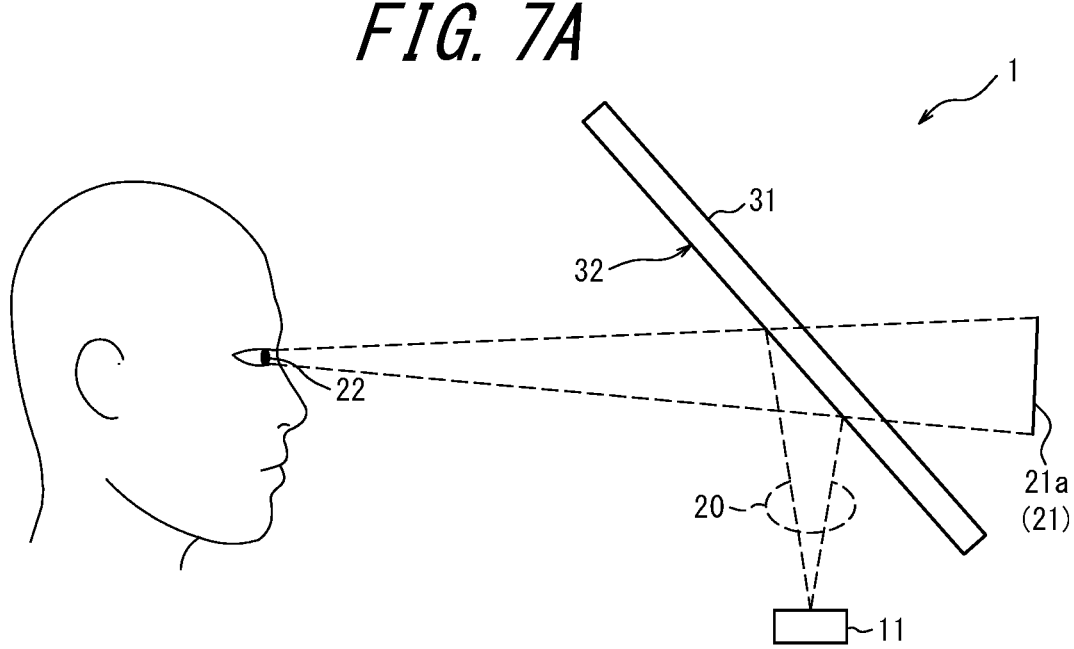
FIG. 7A illustrates an example of the view from the user's perspective.

The projection-target member 31 may be an optical member that receives light and reflects the light. An optical member that reflects light is also referred to as a reflective optical member. As illustrated in FIG. 7A, the image projection light 20 indicated by the dashed line is reflected at the projection-target member 31 in this case. The user can see a virtual image 21a at this time. The magnifying optical system 13 may have a positive refractive power for the user to see the virtual image 21a. The projection-target member 31 may have a positive refractive power for the user to see the virtual image 21a. In the present disclosure, "displayed images" include real images and virtual images. In the present disclosure, references to displaying an image as a virtual image can be interpreted, depending on the context, to mean "visualize an image", "visualize an image by forming a virtual image on the driver's retina", "projecting image projection light that becomes a virtual image", "projecting light that becomes a virtual image", and "projecting a virtual image of an image".

Among light having a wavelength spectrum, the reflective optical member may reflect light of at least a portion of the wavelength spectrum. The reflective optical member may also reflect at least a portion of light regardless of the wavelength of the light. The reflective optical member may be glass, a film, resin, or the like. The reflective optical member may be formed on a base material that includes glass, a film, resin, or the like.

The reflective optical member may be an optical member that specularly reflects light. The optical member that specularly reflects light may, for example, be glass or a film. The reflective optical member may be shaped so that when light from the image projector 11 is specularly reflected, the reflected light is collected on the eyes 22 of the user.

The reflective optical member may be an optical member that reflects light at an angle of reflection differing from the angle of incidence. Reflection at an angle of reflection differing from the angle of incidence is also referred to as reflection at a different angle from specular reflection. The optical member that reflects light at an angle of reflection differing from the angle of incidence is also referred to as a reflection angle control member. The reflection angle control member produces a phase difference when reflecting incident light. The reflection angle control member may be a hologram, a diffraction grating, or the like. When the projection-target member 31 is a reflection angle control member, the display apparatus 10 can cause image projection light 20 emitted over a wider range of the projection-target surface 32 to reach the user's eyes 22.

When the projection-target member 31 is a reflective optical member, the intensity of the image projection light 20 reflected towards the user's eyes 22 is determined in accordance with the reflectance of the reflective optical member. The reflectance of the reflective optical member can be set as needed.

Figure 7B:
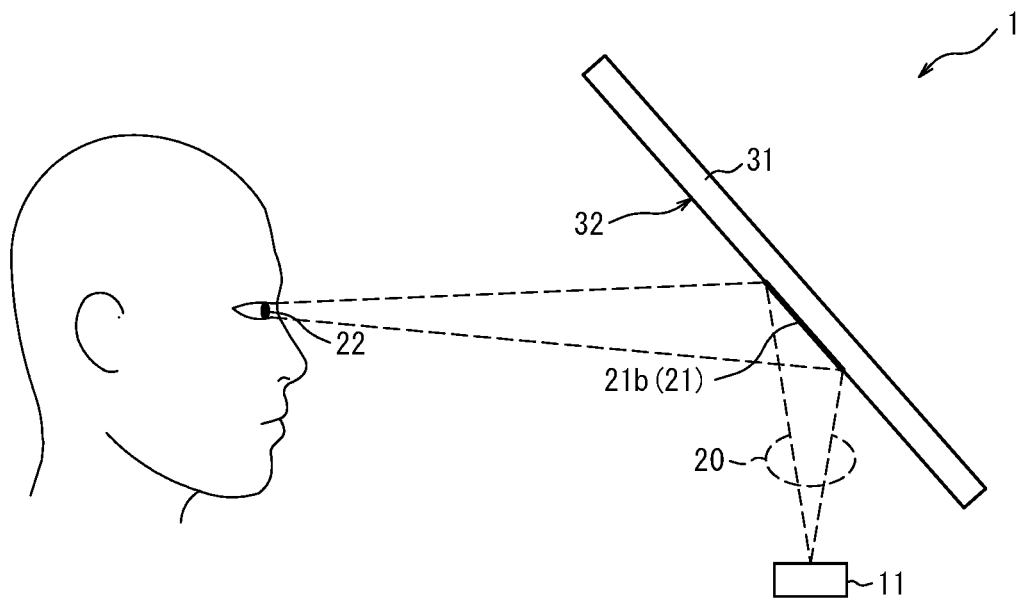
FIG. 7B illustrates an example of the view from the user's perspective.

The projection-target member 31 may be an optical member that receives light and scatters the light (scattering optical member) or an optical member that receives light and emits light (light-emitting member). As illustrated in FIG. 7B, the image projection light 20 indicated by the dashed line is projected onto the projection-target surface 32 in this case. The image projection light 20 forms an image on the projection-target surface 32. The user can then see a real image 21b.

The scattering optical member may, for example, be a transparent member with fine particles, such as Zirconia particles, dispersed therein. When the projection-target member 31 is a scattering optical member, the intensity of the image projection light 20 reaching the user's eyes 22 is determined in accordance with the scattering coefficient of the scattering optical member. The scattering coefficient of the scattering optical member can be set as needed.

The light-emitting member may, for example, be phosphor or quantum dots. In accordance with the energy of incident light, the light-emitting member itself emits light by a reaction produced in the portion on which light is incident. When the projection-target member 31 is a light-emitting member, the intensity of the image projection light 20 reaching the user's eyes 22 is determined in accordance with the energy efficiency of the light-emitting member. The energy efficiency of the light-emitting member can be determined as needed.

In the present embodiment, the projection-target member 31 is described as being a reflective optical member unless otherwise noted. The virtual image 21a and the real image 21b are also referred to together as a display image 21.

[Display Image]

The image projection light 20 projected on the projection-target member 31 forms an image in the field of view of the user. The image projection light 20 formed as an image is recognized as the display image 21. The area of the display image 21 projected on the projection-target surface 32 when the image projector 11 emits the image projection light 20 in one emission direction can be determined by the area of the image generation surface of the image generator 16, the area of the image formation surface of the intermediate image plane 14, the configuration of the magnifying optical system 13, or the like. For example, when the area of the image generation surface or the image formation surface is doubled, the area of the display image 21 projected onto the projection-target surface 32 can be doubled. For example, when the magnification determined by the configuration of the magnifying optical system 13 is doubled, the area of the display image 21 projected onto the projection-target surface 32 can be quadrupled. The area of the display image 21 projected onto the projection-target surface 32 is also referred to as the projected area.

The brightness of the display image 21 is determined by the intensity of the image projection light 20. The intensity of the image projection light 20 may be a value representing brightness. The intensity of the image projection light 20 may be a value representing luminous flux. The intensity of the image projection light 20 may be a value representing illuminance. The intensity of the image projection light 20 can be determined in accordance with the brightness of light emitted by the light source of the image projector 11 or the light source 17, the loss in the magnifying optical system 13, or the like. For example, when the image generator 16 is a liquid crystal device using a surface light source such as a lamp, the intensity of the image projection light 20 can be determined in accordance with the brightness of the lamp or the like. When the image generator 16 is a mirror device that forms an image by scanning a point light source, such as a laser, the intensity of the image projection light 20 can be determined in accordance with the brightness of the point light source and the scan time per pixel.

The first controller 15 may change the emission direction of the image projection light 20 in a time division manner. The first controller 15 may project an image onto multiple positions of the projection-target surface 32 in a time division manner. In the present disclosure, projecting an image onto multiple positions of the projection-target surface 32 in a time division manner refers to how the process of projecting an image onto one position from one image projector 11 is repeated at each position while shifting the timing between positions. In other words, projecting an image onto multiple positions of the projection-target surface 32 in a time division manner refers to dividing the time for projecting an image from one image projector 11 onto multiple positions. For example, the controller 15 may project an image onto a certain position at a certain timing and subsequently project an image onto another position at another timing. While projecting an image onto an arbitrary position at an arbitrary timing, the controller 15 need not project an image onto another position.

When projecting the image projection light 20 from the image generator 16, the first controller 15 changes the emission direction of the image projection light 20 by controlling the image generator 16 or the drive unit 12. When projecting the image projection light 20 from the intermediate image plane 14, the first controller 15 controls the scanning unit 18 to form the display image 21 on each position of the image formation surface of the intermediate image plane 14. This configuration allows the first controller 15 to sequentially project the display image 21 in a time division manner onto each position of the projection-target surface 32 within a predetermined time. The predetermined time may be one cycle of the time division. The display images 21 projected within the predetermined time are also referred to collectively as one frame. The first controller 15 can display one frame by projecting each display image 21 every predetermined time. The time for displaying one frame is also referred to as the frame display time. The number of frames displayed in one second is also referred to as the frame rate. The frame rate is calculated as the inverse of the frame display time. For example, when the frame display time is 20 milliseconds, the frame rate is 50 frames per second (fps).

Figure 8A:
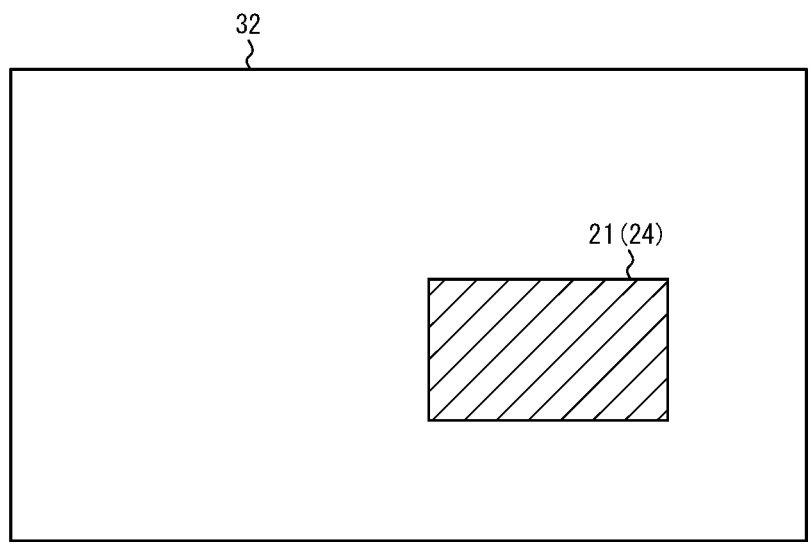
FIG. 8A illustrates a display example of a display image on a projection-target surface.
Figure 8B:
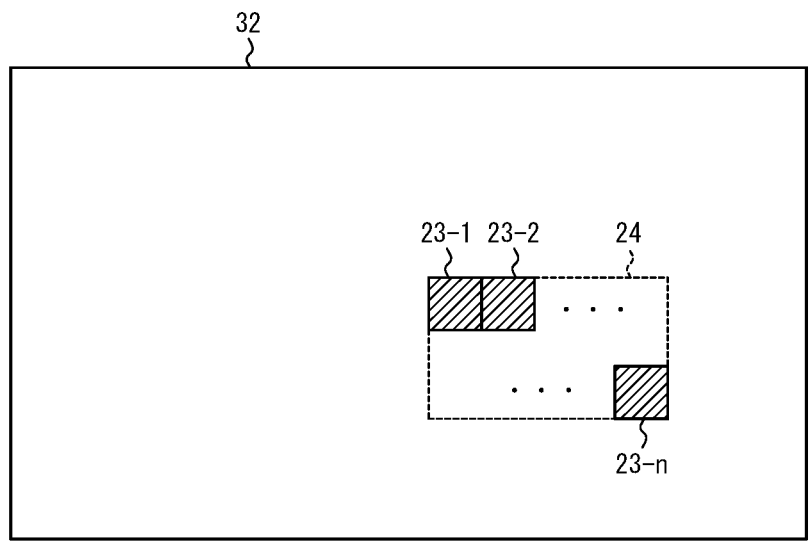
FIG. 8B illustrates a display example of a display image on a projection-target surface.

As illustrated in FIG. 8A, the first controller 15 may cause one display image 21 to be displayed in one frame. The range of the projection-target surface 32 over which the display image 21 is projected is also referred to as a region 24. One display image 21 may include two or more sub-images 23-1 to n. Here, n is a natural number and is two or more. The two or more sub-images 23-1 to n are also collectively referred to as sub-images 23. Each sub-image 23 may be at least a partially different image or may be the same image. The projected area of the sub-image 23 may be the area projectable at once by the image projector 11. The area projectable at once by the image projector 11 may, for example, be the area projected by an image generated over the entire image generation surface of the image generator 16 or over the entire image formation surface of the intermediate image plane 14. As illustrated in FIG. 8B, the first controller 15 may sequentially project the sub-images 23 in a time division manner onto the region 24. In this way, the first controller 15 can display the display image 21 over the entire region 24 that has an area greater than the area projectable at once by the image projector 11. The sub-image 23 being projected sequentially in a time division manner refers, for example, to the sub-image 23-1 being projected at a first timing and the sub-image 23-n being projected at an $n^{th}$ timing different from the first timing. While the sub-image 23-1 is projected at the first timing, the sub-images 23-2 to 23-n need not be projected. Similarly, while the sub-images 23-2 to 23-n are projected at the $2^{nd}$ through $n^{th}$ timings, the other sub-images 23 need not be projected.

Figure 9:
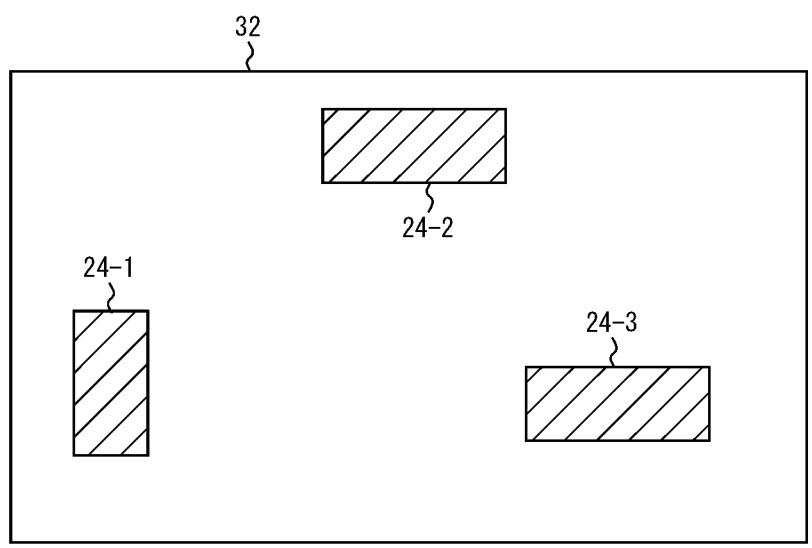
FIG. 9 illustrates a display example of a display image on a projection-target surface.

The first controller 15 may sequentially project the display image 21 in a time division manner onto two or more regions 24 on the projection-target surface 32. The first controller 15 may cause two or more display images 21 to be displayed in one frame. When the number of display images 21 is two or greater, the regions 24 in which the display images 21 are projected are also referred to as the first region 24-1 to the $m^{th}$ region 24-m. Here, m is a natural number and is two or more. As illustrated in FIG. 9, for example, the first controller 15 may project a display image 21 into each of a first region 24-1, a second region 24-1, and a third region 24-3. The number of regions 24 on the projection-target surface 32 is not limited to three, as in the example in FIG. 9. The number may be two or fewer or may be four or more. The regions 24 may be separate from or adjacent to each other on the projection-target surface 32. The display image 21 projected onto each region 24 may be an image composed of two or more sub-images 23. The display images 21 being projected in a time division manner refers, for example, to the display images 21 being projected at different first through third timings onto the first region 24-1 through the third region 24-3. While one display image 21 is projected onto the first region 24-1 at the first timing, the other display images 21 need not be projected onto the other regions 24. Similarly, while a display image is projected onto the second region 24-2 and the third region 24-3 at the second and third timings, display images 21 need not be projected onto the other regions 24.

When the image formed on the image formation surface of the intermediate image plane 14 is projected onto the projection-target surface 32, regions 24 may be provided on the image formation surface in correspondence with the regions 24 on the projection-target surface 32. To display the display images 21 as in the example illustrated in FIG. 9, the first controller 15 may provide a first region 24-1 to a third region 24-3 on the image formation surface. The first controller 15 may form a display image 21 in each region 24. The regions 24 on the image formation surface are provided at positions corresponding to the regions 24 on the projection-target surface 32.

When the display image 21 is projected in a time division manner, the display image 21 may appear to be blinking to a human eye. In other words, the display image 21 may appear to be flickering to a human eye. The first controller 15 may project the display image 21 in a time division manner at a frame rate that is not discernible at the resolution of a human eye. Flickering of the display image 21 seen by a human eye can thus be reduced. In general, a human eye has a resolution such that a light that blinks 24 times or less in one second appears to flicker. The first controller 15 may set the frame rate of the display image 21 to 30 fps or more, for example. That is, the first controller 15 may perform the control to project the display image 21 onto the regions 24 in a time division manner 30 times or more per second.

<Brightness of Display Image>

The case of the image projection light 20 being projected in a time division manner is described. The brightness of the display image 21 projected onto the regions 24 of the projection-target surface 32 is described for the case of the optical path length of the image projection light 20 to the eyes 22 and the divergence angle of light incident on the eyes 22 being equivalent. This brightness is determined in accordance with the ratio between the durations, within the frame display time, for which the image projection light 20 is and is not projected. For example, when the ratio between the durations for which the image projection light 20 is and is not projected is 1:1, the brightness of the display image 21 reduces by 50% as compared to when the image projection light 20 is continually projected throughout the frame display time. When the display image 21 is projected onto two or more regions 24 in a time division manner for the same duration within the frame display time in each region 24, the brightness of the display image 21 is inversely proportional to the total area of the regions 24. In other words, as the sum of the areas of the regions 24 increases, the brightness of the display image 21 decreases. When the projection time differs for each region 24, the brightness of a certain display image 21 decreases as the projection time of the display image 21 is proportionally smaller.

When the brightness of the display image 21 is lower than a predetermined brightness, the display image 21 may not be visible to the human eye or may be difficult to see. The predetermined brightness can be set in accordance with the sensitivity of the human eye. The predetermined brightness may be set in accordance with the intensity of outside light incident as the background of the display image 21. The first controller 15 may, for example, acquire the illuminance of outside light from an illuminance sensor. The first controller 15 may set the predetermined brightness on the basis of the acquired illuminance. The first controller 15 may set the predetermined brightness in accordance with how bright the background is. The first controller 15 may, for example, set the predetermined brightness to be low for a dark external environment, such as night. The first controller 15 may, for example, set the predetermined brightness to be high for a bright external environment, such as a sunny day. The first controller 15 may determine the projection time of the display image 21 in accordance with the predetermined brightness and the intensity of the image projection light 20. The first controller 15 may determine a lower limit on the projection time of a certain display image 21 so that the brightness of the display image 21 becomes at least a predetermined brightness.

The first controller 15 may determine the area of each region 24 in which the display image 21 is projected in accordance with the predetermined brightness and the intensity of the image projection light 20. When projecting display images 21 onto two or more regions 24, the first controller 15 may determine an upper limit on the sum of the areas of the regions 24 so that the brightness of each display image 21 becomes at least a predetermined brightness. The upper limit on the sum of the areas of the regions 24 onto which display images 21 are projected is also referred to as the projected area upper limit. The area of the region 24 illustrated in FIG. 8A may be equal to or less than the projected area upper limit. This configuration allows the brightness of the display image 21 to become at least a predetermined brightness. The sum of the areas of the first region 24-1, the second region 24-2, and the third region 24-3 illustrated in FIG. 9 may be equal to or less than the projected area upper limit. This configuration allows the brightness of the display images 21 projected onto the first region 24-1, the second region 24-2, and the third region 24-3 to become at least a predetermined brightness.

When the display image 21 is only projected onto one region 24 as well, the area of the region 24 may be equal to or less than the projected area upper limit. In other words, the sum of the areas of one or more regions 24 may be equal to or less than the projected area upper limit. For example, when one display image 21 is composed of two or more sub-images 23, the area of the region 24 in which the display image 21 is projected is the sum of the projected area of each sub-image 23. This configuration allows the brightness of each sub-image 23 to become at least a predetermined brightness. In other words, the brightness of the display image 21 overall can become at least a predetermined brightness.

The image projection light 20 emitted from the image generator 16 or the intermediate image plane 14 expands at a predetermined angle. The predetermined angle at which the image projection light 20 expands is also referred to as the angle of divergence. The area of the display image 21 when the image projection light 20 is projected onto the projection-target surface 32 changes in accordance with the angle of divergence of the image projection light 20 and the length of the optical path of the image projection light 20 to the projection-target surface 32. The length of the optical path of the image projection light 20 from the image projector 11 to the projection-target surface 32 is also referred to as the projection optical path length. The start of the optical path of the image projection light 20 may, for example, be the reflection surface of the last mirror in the magnifying optical system 13 included in the image projector 11. The start of the optical path of the image projection light 20 may be the image generation surface of the image generator 16 or the image formation surface of the intermediate image plane 14. The start of the optical path of the image projection light 20 may be any component of the image projector 11.

Figure 10A:
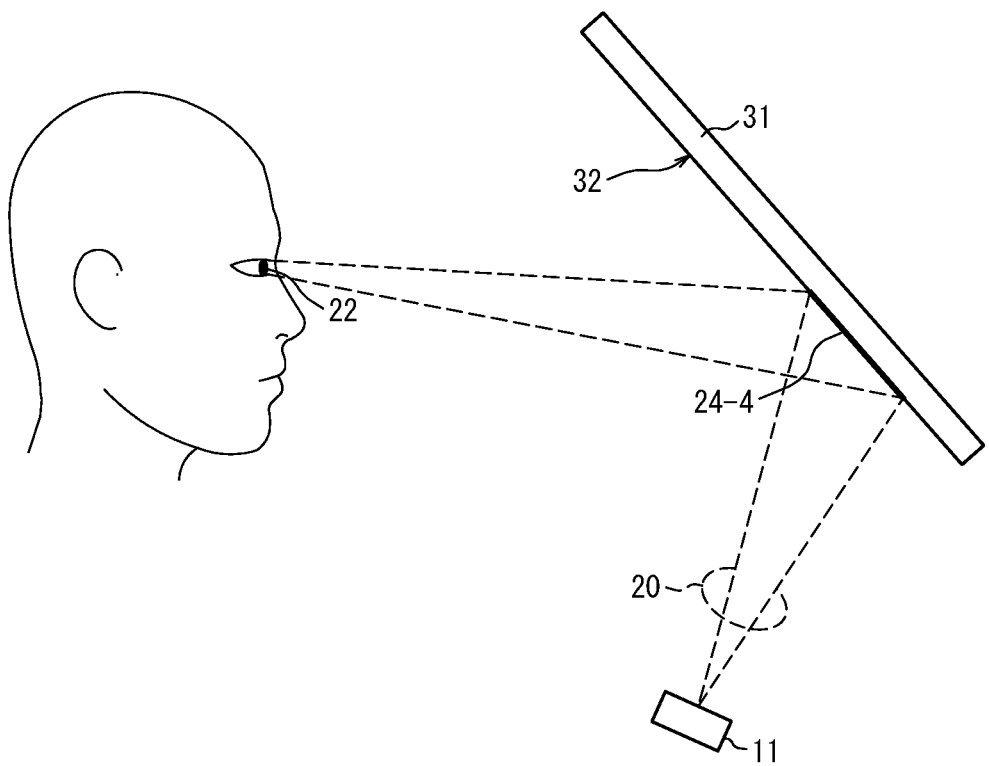
FIG. 10A illustrates a display example corresponding to the position of a display image on a projection-target surface.
Figure 10B:
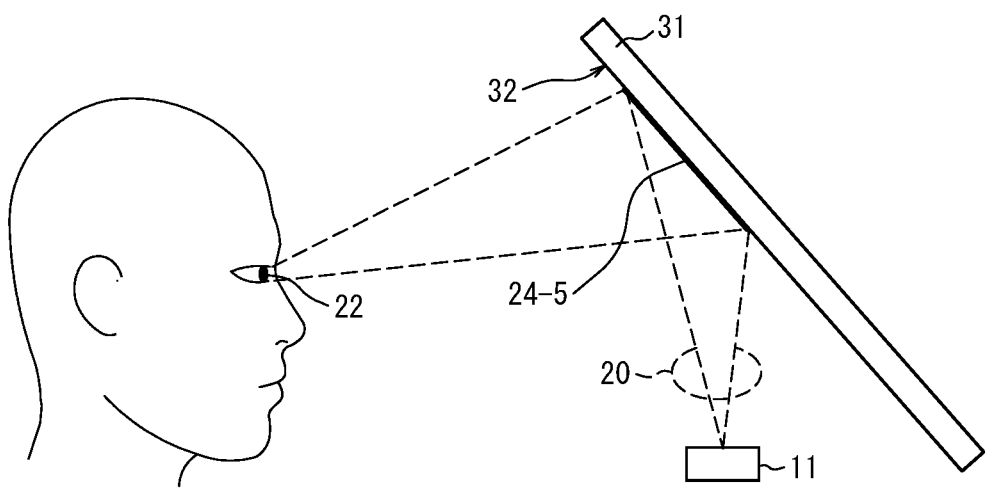
FIG. 10B illustrates a display example corresponding to the position of a display image on a projection-target surface.

When the projection optical path length is relatively short, for example as illustrated in FIG. 10A, the area of a fourth region 24-4 becomes relatively small. Conversely, when the projection optical path length is relatively long, for example as illustrated in FIG. 10B, the area of a fifth region 24-5 becomes relatively large. At the same intensity of the image projection light 20, the brightness of the display image 21 projected onto the region 24 reduces as the projected area onto the region 24 is larger.

The first controller 15 may control the intensity of the image projection light 20 so that the brightness of the display image 21 becomes substantially equal, regardless of the projection optical path length. When projecting the image projection light 20 onto the fourth region 24-4 that has a relatively small area, as in the example in FIG. 10A, the first controller 15 may reduce the intensity of the image projection light 20. When projecting the image projection light 20 onto the fifth region 24-5 that has a relatively large area, as in the example in FIG. 10B, the first controller 15 may increase the intensity of the image projection light 20.

The first controller 15 may determine the display time of the display image 21 so that the brightness of the display image 21 becomes substantially equal regardless of the projection optical path length. When projecting the image projection light 20 indicated by the dashed line onto the fourth region 24-4 that has a relatively small area, as in the example in FIG. 10A, the first controller 15 may shorten the projection time for the fourth region 24-4. When projecting the image projection light 20 indicated by the dashed line onto the fifth region 24-5 that has a relatively large area, as in the example in FIG. 10B, the first controller 15 may lengthen the projection time for the fifth region 24-5. The projected area upper limit need not be changed even when the projection time for the fifth region 24-5 is lengthened.

The projection-target member 31 may have a reflectance that differs in accordance with the position on the projection-target surface 32 so that the brightness of the display image 21 becomes substantially equal regardless of the projection optical path length. The projection-target member 31 may have a relatively low reflectance in the fourth region 24-4 of the example in FIG. 10A. The projection-target member 31 may have a relatively high reflectance in the fifth region 24-5 of the example in FIG. 10B.

[Image Display Method]

Figure 11:
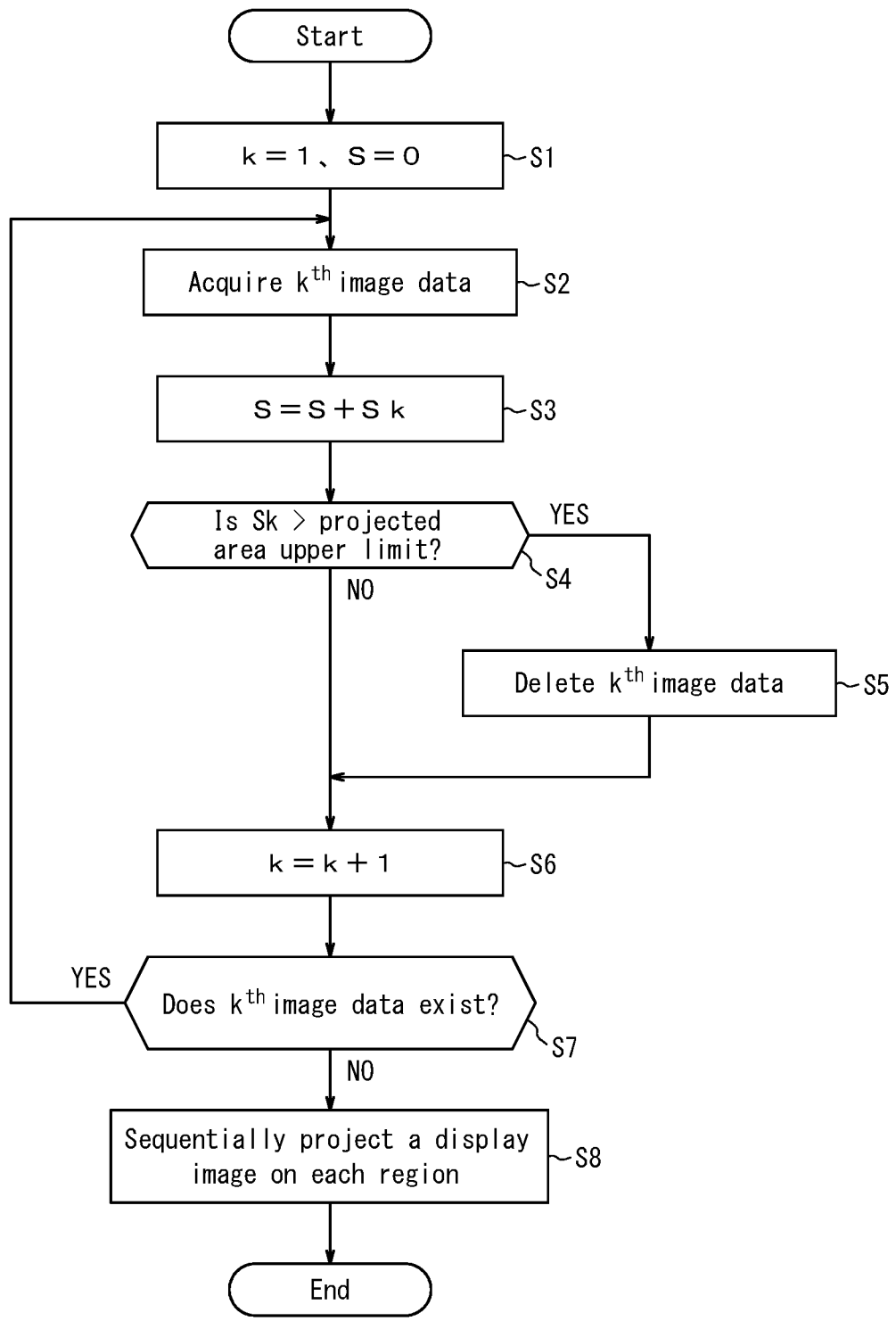
FIG. 11 is a flowchart illustrating an example of a display method.

An example of an image display method executed by the display apparatus 10 according to the present embodiment is described with reference to FIG. 11.

Step S1: the first controller 15 sets a variable (k) used as a counter to 1. The first controller 15 resets a variable (S) indicating the cumulative area of the region 24 on which the display image 21 is projected to 0. Here, k is a natural number.

Step S2: the first controller 15 acquires data of the display image 21 to be projected onto the $k^{th}$ region 24-$k$ ($k^{th}$ image data). The $k^{th}$ image data may include data indicating the display position of the image. The $k^{th}$ image data may be acquired from a memory device of the first controller 15 or from an external apparatus. The first controller 15 may store the acquired $k^{th}$ image data in working memory or in a memory device.

Step S3: the first controller 15 adds the area (Sk) of the $k^{th}$ region 24-$k$, calculated on the basis of the $k^{th}$ image data, to the cumulative area (S). When data related to the display position of an image is included in the $k^{th}$ image data, the first controller 15 may calculate the projection optical path length on the basis of the display position of the image. The first controller 15 may calculate the area (Sk) of the $k^{th}$ region 24-$k$ on the basis of the projection optical path length.

Step S4: the first controller 15 judges whether the cumulative area (S) exceeds the projected area upper limit. When the cumulative area (S) exceeds the projected area upper limit (step S4: YES), the process proceeds to step S5. When the cumulative area (S) does not exceed the projected area upper limit (step S4: NO), the process proceeds to step S6.

Step S5: the first controller 15 deletes the $k^{th}$ image data from the working memory or the memory device. In this case, the display image 21 corresponding to the deleted $k^{th}$ image data is not projected in the subsequent projection step.

Step S6: the first controller 15 increments the counter variable (k) by 1.

Step S7: the first controller 15 judges whether $k^{th}$ image data exists. The $k^{th}$ image data does not exist when, for example, k>m. When the $k^{th}$ image data exists (step S7: YES), the process returns to step S2. When the $k^{th}$ image data does not exist (step S7: NO), the process proceeds to step S8.

Step S8: the first controller 15 sequentially projects a display image 21 onto each region 24 in a time division manner on the basis of the image data stored in working memory or in a memory device. The process then terminates. The process illustrated in FIG. 11 may proceed to step S8 after step S5.

The $k^{th}$ regions 24-$k$ may be sorted by area. For example, the region 24 with the largest area may be designated the first region 24-1, and the region 24 with the next largest area may be designated the second region 24-2. Conversely, the region 24 with the smallest area may be designated the first region 24-1, and the region 24 with the next smallest area may be designated the second region 24-2.

The $k^{th}$ regions 24-$k$ may be sorted on the basis of the priority of the display image 21 to be projected. For example, when a display image 21 is to be displayed by the first controller 15 on a priority basis, the region 24 onto which the display image 21 is projected may be designated the first region 24-1.

Sorting of the $k^{th}$ regions 24-$k$ is not limited to the above example, and a different sorting method may be used.

[Example of Mounting in a Vehicle]

Figure 12:
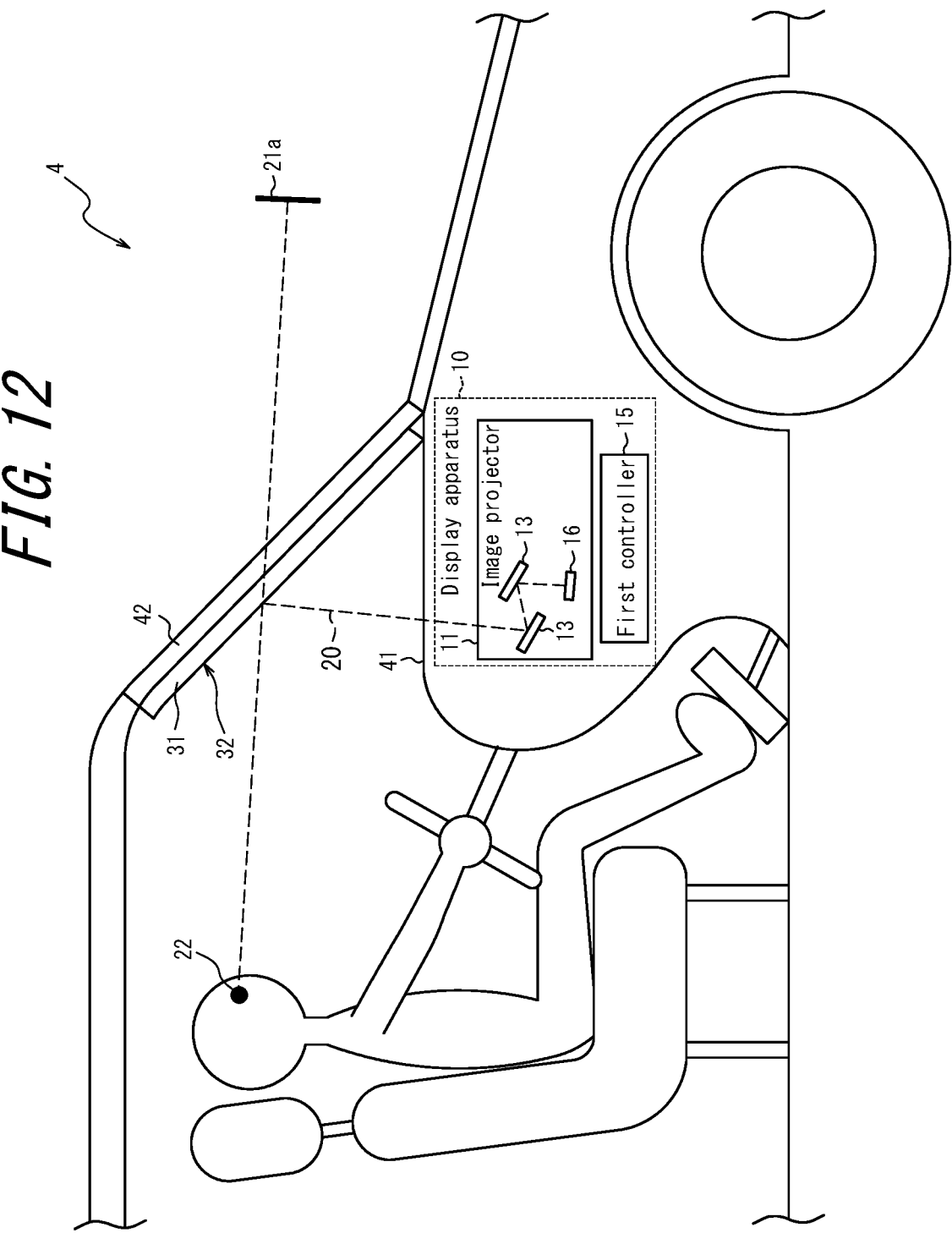
FIG. 12 illustrates an example configuration when mounting a display system in a vehicle.

As illustrated in FIG. 12, the display system 1 according to the present embodiment can be mounted in a vehicle 4. The vehicle 4 includes an instrument panel 41 and a front windshield 42 (windshield). The display apparatus 10 is provided in the instrument panel 41. The projection-target member 31 is provided on the front windshield 42. The display apparatus 10 and the projection-target member 31 have a configuration similar to that of FIG. 1.

The image projection light 20 emitted from the image projector 11 is indicated in FIG. 12 by a dashed line. The image projection light 20 is projected on the projection-target member 31 from the image projector 11. The image projection light 20 projected on the projection-target surface 32 of the projection-target member 31 forms an image in the field of view of the driver of the vehicle 4. When the projection-target member 31 is a reflective optical member, the driver can see the image formed by the image projection light 20 as a virtual image 21$a$. The display apparatus 10 mounted in the vehicle 4 can project the image projection light 20 over a wide range of the front windshield 42. The driver can see the image formed by the image projection light 20 as a virtual image 21a in various directions.

The location at which the projection-target member 31 is provided is not limited to the front windshield 42. The projection-target member 31 may be provided in a combiner, a door window, the rear windshield, or the like of the vehicle 4. When the projection-target member 31 is provided in these locations, the projection-target member 31 transmits light from the background of the real space on the opposite side of the projection-target member 31 from the driver. The driver of the vehicle 4 can see the background of real space as a result of the light transmitted by the projection-target member 31. The driver of the vehicle 4 can see the virtual image 21a displayed by the display apparatus 10 as being in overlap with the background of real space on the opposite side of the projection-target member 31.

The projection-target member 31 may be provided at a location such as a pillar, the roof, or a door.

The display apparatus 10 is not limited to being provided in the instrument panel 41 and may be provided at a variety of locations in the vehicle 4 in accordance with the location of the projection-target member 31.

The display system 1 may display an image over the entire front windshield 42. In this case, the display apparatus 10 may be provided at the lower central portion of the front windshield 42. This configuration allows the brightness of the display image 21 to become at least a predetermined brightness more easily regardless of whether the image is displayed to the right or left side of the front windshield 42.

The display system 1 may display an image from an electronic mirror that substitutes for the function of a side mirror, a room mirror, or the like. When the display system 1 displays an image from an electronic mirror, the display apparatus 10 may be provided near the projection-target member 31. This configuration allows the display system 1 to display an image from an electronic mirror at a higher brightness. The display apparatus 10 may, for example, be provided near the pillar by the passenger seat or the driver seat. When the display apparatus 10 is provided by the passenger seat, the location of the display apparatus 10 can be chosen more freely. The reflectance of the projection-target member 31 may be relatively high at least in a portion where the image from an electronic mirror is projected. When the projection-target member 31 is a scattering optical member, the scattering coefficient of the projection-target member 31 may be relatively high at least in a portion where the image from an electronic mirror is projected. When the projection-target member 31 is a light-emitting member, the energy efficiency of the projection-target member 31 may be relatively high at least in a portion where the image from an electronic mirror is projected.

The case of a dedicated apparatus for displaying electronic mirror images being provided and the case of the display system 1 according to the present embodiment having a function to display images from an electronic mirror are now compared. A dedicated apparatus for displaying electronic mirror images may be capable of display corresponding to the display quality required for electronic mirror images. The display quality may, for example, be the brightness or sharpness of the image to be displayed. On the other hand, the reflectance, scattering coefficient, or energy efficiency may differ between at least one portion and other portions of the projection-target member 31 in the display system 1. For example, the reflectance, scattering coefficient, or energy efficiency in the portion of the projection-target member 31 where the electronic mirror image is displayed may be higher than in other portions. This configuration allows the display system 1 according to the present embodiment to display images in accordance with the display quality required for electronic mirror images without use of a separate apparatus such as a dedicated apparatus for displaying electronic mirror images. Electronic mirror images have been used as an example, but the display system 1 may be configured to be capable of displaying a different type of image, for which a different display quality is required, at the different display quality in at least a portion of the projection-target surface 32.

The display system 1 according to the present embodiment may be mounted in a moveable body. The term "moveable body" in the present disclosure includes vehicles, ships, and aircraft. The term "vehicle" in the present disclosure includes, but is not limited to, automobiles and industrial vehicles and may also include railway vehicles, vehicles for daily life, and fixed-wing aircraft that run on a runway. Automobiles include, but are not limited to, passenger vehicles, trucks, buses, motorcycles, and trolley buses, and may include other vehicles that travel on the road. Industrial vehicles include industrial vehicles for agriculture and for construction. Industrial vehicles include, but are not limited to, forklifts and golf carts. Industrial vehicles for agriculture include, but are not limited to, tractors, cultivators, transplanters, binders, combines, and lawnmowers. Industrial vehicles for construction include, but are not limited to, bulldozers, scrapers, backhoes, cranes, dump cars, and road rollers. The term "vehicle" includes man-powered vehicles. The categories of vehicles are not limited to the above examples. For example, automobiles may include industrial vehicles that can be driven on the road. The same vehicle may also be included in multiple categories. The term "ship" in the present disclosure includes marine jets, boats, and tankers. The term "aircraft" in the present disclosure includes fixed-wing aircraft and rotor-craft.

The display system 1 and display apparatus 10 in the present embodiment can be installed not only in the vehicle 4 but also in a variety of devices. The display apparatus 10 may, for example, be mounted in an image display apparatus such as a projector. The projector may, for example, be a projector for projection mapping that projects video onto a target such as a building. Projection mapping is also referred to as video mapping. The display apparatus 10 may be mounted in a planetarium projector. The display system 1 may, for example, be mounted in an image display system such as a home theater.

The display apparatus 10 according to the present embodiment can emit image projection light 20 for projecting the display image 21 onto the projection-target surface 32 in different directions in a time division manner. The display apparatus 10 according to the present embodiment controls the image projector 11 to be oriented only towards the region 24 onto which the display image 21 is to be projected. The display apparatus 10 can therefore display a display image 21 that is bright enough to be visible anywhere in a wide range of the projection-target surface 32. The display system 1 according to the present embodiment allows the user to recognize the display image 21 as a virtual image 21a. Hence, the user can easily focus on both the display image 21 and the scenery on the other side of the projection-target member 31.

In the display system 1 according to the present embodiment, at least one of a reflective optical member, a scattering optical member, and a light-emitting member may be provided in at least a portion of the projection-target member 31. In this case, the display system 1 can present both a virtual image 21a and a real image 21b to the user's eyes 22. This configuration allows selection of a display method appropriate for the purpose of displaying the display image 21. At least two of a reflective optical member, a scattering optical member, and a light-emitting member may be provided in overlap in at least a portion of the projection-target member 31.

Figure 13:
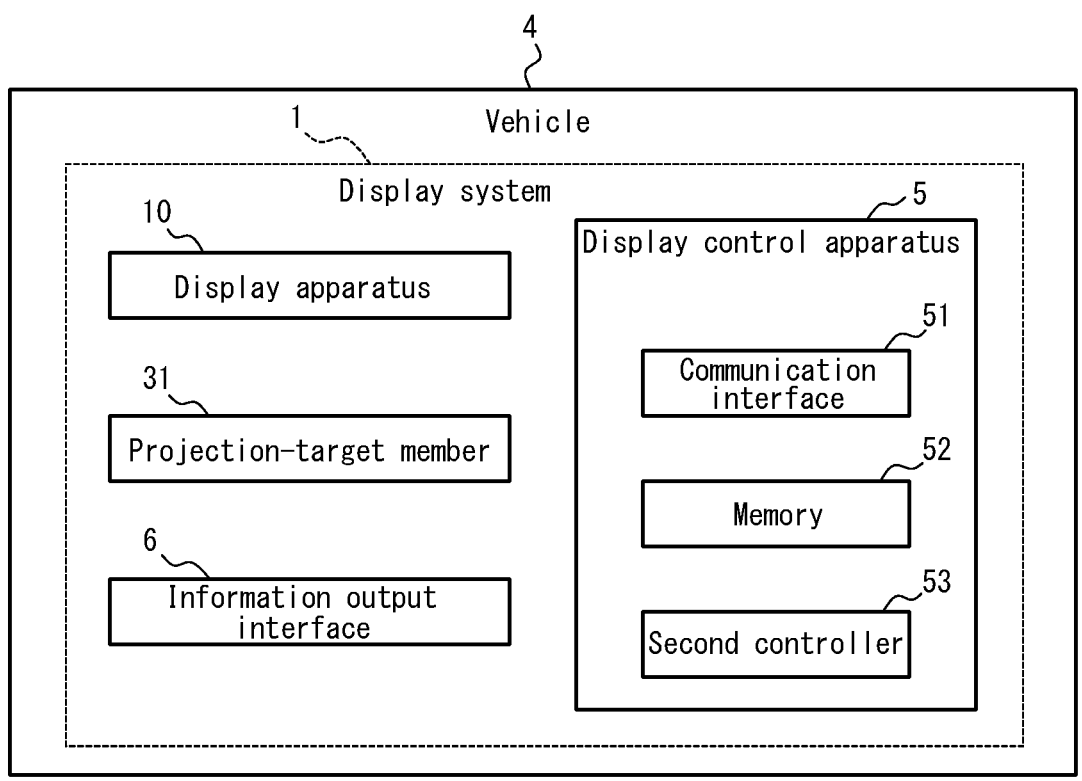
FIG. 13 is a block diagram illustrating the schematic configuration of a vehicle.

A vehicle 4 including the display system 1 according to the present embodiment is described in detail with reference to FIG. 13.

The display system 1 according to the present embodiment includes the display apparatus 10, the projection-target member 31, a display control apparatus 5, and an information output interface 6. The details of the display apparatus 10 and the projection-target member 31 are as described above. In one of the embodiments, either or both of the display control apparatus 5 and the information output interface 6 need not be included in the display system 1. In this case, the vehicle 4 includes the display system 1 and either or both of the display control apparatus 5 and the information output interface 6 not included in the display system 1.

The display control apparatus 5 includes a communication interface 51, a memory 52, and a second controller 53. In one of the embodiments, a portion or all of the structure and functions of the display control apparatus 5 may be provided in the display apparatus 10. In one of the embodiments, a portion or all of the structure and functions of the display control apparatus 5 may be implemented as an apparatus independent from the display apparatus 10.

The communication interface 51 may include an interface capable of communicating with an apparatus provided outside the display control apparatus 5. A physical connector or a wireless communication device, for example, may be adopted as this interface. In one of the embodiments, the communication interface 51 connects to a network of the vehicle 4, such as a CAN. Physical connectors include an electrical connector corresponding to transmission by an electrical signal, an optical connector corresponding to transmission by an optical signal, and an electromagnetic connector corresponding to transmission by an electromagnetic wave. Electrical connectors include connectors conforming to IEC60603, connectors conforming to the USB standard, connectors comprising RCA terminals, connectors comprising S terminals prescribed by EIAJ CP-1211A, connectors comprising D terminals prescribed by EIAJ RC-5237, connectors conforming to the HDMI® (HDMI is a registered trademark in Japan, other countries, or both) standard, and connectors comprising a coaxial cable that includes a BNC connector (British naval connector or baby-series N connector). Optical connectors include a variety of connectors conforming to IEC 61754. Wireless communication devices include wireless communication devices conforming to standards that include Bluetooth® (Bluetooth is a registered trademark in Japan, other countries, or both) and IEEE802.11. The wireless communication device includes at least one antenna. In the present embodiment, the communication interface 51 may be connected communicatively to each of the display apparatus 10 and the information output interface 6.

The memory 52 may include a primary memory device and a secondary memory device. The memory 52 may, for example, be configured using a semiconductor memory, a magnetic memory, an optical memory, or the like. The semiconductor memory may include volatile memory and non-volatile memory. The magnetic memory may, for example, include a hard disk, magnetic tape, or the like. The optical memory may, for example, include a compact disc (CD), a digital versatile disc (DVD), a Blu-Ray® (BD) Disc (Blu-ray is a registered trademark in Japan, other countries, or both), or the like. For example, the memory 52 stores various information and programs necessary for operation of the display apparatus 10.

The second controller 53 includes one or more processors. Processors include universal processors that execute particular functions by reading particular programs and dedicated processors that are specialized for particular processing. Dedicated processors include application specific integrated circuits (ASICs) for specific applications. Processors also include programmable logic devices (PLDs). PLDs include field-programmable gate arrays (FPGAs). The second controller 53 may be either a system-on-a-chip (SoC) or a system in a package (SiP) with one processor or a plurality of processors that work together. The second controller 53 controls overall operations of the display control apparatus 5. For example, the second controller 53 may generate display control information on the basis of information acquired from the below-described information output interface 6. The display control information is, for example, used for operation control of the display apparatus 10. The display control information may include information on characters and images such as graphics to be displayed within the driver's field of view through the projection-target member 31. The display control information may include information indicating the display form of information to be displayed within the driver's field of view through the projection-target member 31. The display form may, for example, include the display position, size, shape, color, brightness, shading, and the like. The second controller 53 outputs the display control information to the display apparatus 10. The display apparatus 10 displays a variety of information within the driver's field of view through the projection-target member 31 on the basis of the acquired display control information. In one of the embodiments, the second controller 53 may control operations of the information output interface 6. Details on the operations of the display control apparatus 5 controlled by the second controller 53 are provided below.

The information output interface 6 includes a variety of apparatuses provided in the vehicle 4.

For example, the information output interface 6 may include one or more imaging apparatuses. In the present embodiment, the information output interface 6 includes a plurality of imaging apparatuses. A front camera, a left-side camera, a right-side camera, a rear camera, an interior camera, and the like are included in the plurality of imaging apparatuses, but these examples are not limiting. The front camera, left-side camera, right-side camera, and rear camera are installed in the vehicle 4 to be capable of capturing images respectively of the outside area to the front, the left side, the right side, and the rear of the vehicle 4. For example, the front camera, left-side camera, right-side camera, and rear camera may each be capable of wide-angle shooting and be capable of capturing images of objects all around the vehicle 4. The interior camera is installed in the vehicle 4 to be capable of capturing images of objects inside the vehicle. For example, the interior camera can capture images of the driver of the vehicle 4. The interior camera may detect the spatial position of the driver's eyes on the basis of a captured image of the driver. Alternatively, the display control apparatus 5 or the second controller 53 may detect the spatial position of the driver's eyes on the basis of a captured image of the driver.

The front camera, left-side camera, right-side camera, rear camera, and interior camera include a solid-state imaging device. Examples of solid-state imaging devices include charge-coupled device (CCD) image sensors and complementary MOS (CMOS) image sensors. In one of the embodiments, the front camera can be a "stereo camera" that can capture an image of the area in front of the vehicle 4 and also measure the distance to an object in front. A "stereo camera" refers to a plurality of cameras that have mutual parallax and that work together. A stereo camera includes a plurality of cameras. The stereo camera can cause the plurality of cameras to work together to capture an image of an object in front of the vehicle 4 from a plurality of directions. The stereo camera may be a device that includes a plurality of cameras in a single housing. The stereo camera may also be a device that includes two or more independent cameras positioned apart from each other. The distance to an object included in the images captured by the stereo camera can be calculated on the basis of the parallax of the object.

For example, the information output interface 6 may include an interface capable of communicating with an external apparatus provided outside the vehicle 4. Examples of the external apparatus include a server on the Internet and the driver's mobile phone. The information output interface 6 may include an interface for vehicle to pedestrian communication, vehicle to infrastructure communication, and vehicle to vehicle communication. In one of the embodiments, the information output interface 6 may include a receiver corresponding to the optical beacon in dedicated short-range communication (DSRC) and/or the vehicle information and communication system (VICS)® (VICS is a registered trademark in Japan, other countries, or both) provided in Japan. The information output interface 6 may include a receiver corresponding to a road traffic information provision system of another country. The information output interface 6 may, for example, acquire real-time traffic information, information indicating a temporary change in the speed limit of the road, information related to an object detected by another vehicle, information indicating the state of a traffic signal, or the like from an external apparatus in a wired or wireless manner.

The information output interface 6 is not limited to the above-described structure and may, for example, include an electronic control unit or engine control unit (ECU), a speed sensor, an acceleration sensor, a rotation angle sensor, a steering angle sensor, an engine speed sensor, an accelerator sensor, a brake sensor, an illuminance sensor, a raindrop sensor, an odometer, an obstacle detection apparatus that uses millimeter wave radar, an electronic toll collection system (ETC) receiver, a global positioning system (GPS) apparatus, a navigation apparatus, or the like.

The information output interface 6 outputs information related to the vehicle 4 and information indicating the external environment of the vehicle 4 to the display control apparatus 5 over a CAN or a dedicated line, for example. The information related to the vehicle 4 is also referred to below as vehicle information or moveable body information. The information related to the external environment of the vehicle 4 is also referred to as environment information. The vehicle information and the environment information can be acquired from a variety of apparatuses included in the information output interface 6.

The vehicle information may include any information related to the vehicle 4, such as the speed, acceleration, turning gravity, tilt, direction, turning state, steering angle, coolant temperature, fuel level, battery level, battery voltage, engine speed, transmission gear, whether the accelerator is depressed, accelerator position, whether the brake is depressed, the degree of brake depression, whether the parking brake is on, the difference in rotational speed between the front/back wheels or four wheels, tire pressure, damper expansion/contraction amount, spatial position of the driver's eyes, number of passengers and seating positions, seatbelt wearing information, open/closed state of doors, open/closed state of windows, temperature inside the vehicle, whether the air-conditioning is on, temperature setting of the air-conditioning, air flow rate of the air conditioning, air circulation setting, operation status of wipers, driving mode, information on connection to external devices, current time, average gas mileage, instantaneous gas mileage, on/off state of various lights, position information of the vehicle 4, and the like. The various lights may, for example, include the headlights, fog lights, taillights, position lights, and turn signals.

The environment information may include any information related to the external environment of the vehicle 4, such as the brightness around the vehicle 4, the weather, the air pressure, the outside temperature, map information, road information, route information to the destination of the vehicle 4, images captured by the imaging apparatuses, and the like. In one of the embodiments, the environment information may include information obtained on the basis of a captured image, such as information indicating the below-described object in the captured image, movement of the object, and the state of the object.

[Operations of Display Control Apparatus]

Details of the operations of the display control apparatus 5 that generates and outputs display control information on the basis of information acquired from the information output interface 6 are described.

The display control apparatus 5 acquires vehicle information and environment information from the information output interface 6. On the basis of at least one of the vehicle information and the environment information acquired from the information output interface 6, the display control apparatus 5 detects at least one of movement of the vehicle 4, the state of the vehicle 4, the state of the external environment of the vehicle 4, an object nearby or inside the vehicle 4, movement of the object, and the state of the object. In the present disclosure, to "detect" can mean "recognize" or "infer", depending on the circumstances.

Examples of the movement and the state of the vehicle 4 may include the start of movement, acceleration, deceleration, stopping, right/left turns, a lane change, forward movement, parking, and the current position of the vehicle 4. The movement and state of the vehicle 4 detectable by the display control apparatus 5 are not limited to these examples. The movement and state of the vehicle 4 may be detected with any algorithm that uses at least one of the vehicle information and the environment information.

The brightness of the external environment of the vehicle 4, the weather, rainfall, the route to the destination, or the like may be included in the state of the external environment. The state of the external environment of the vehicle 4 detectable by the display control apparatus 5 is not limited to these examples. The state of the external environment can be detected with any algorithm that uses the environment information.

The objects around and inside the vehicle 4 may, for example, include roads, lanes, white lines, gutters, sidewalks, pedestrian crossings, road signs, traffic signs, guardrails, traffic signals, pedestrians, other vehicles, the driver of the vehicle 4, and the like. The objects detectable by the display control apparatus 5 are not limited to these examples. Objects may be detected with any object detection algorithm. For example, objects may be detected with pattern matching, feature point extraction, or the like that use the captured image included in the environment information.

Examples of the movement and state of the object may include another vehicle, a pedestrian, or the like approaching the vehicle 4, moving away from the vehicle 4, or entering or exiting the path of the vehicle 4; the distance from the vehicle 4 to the object; the shape of road; the state of a traffic signal; and the driver's posture, drowsiness, line of sight, field of view, distracted driving, and dozing off while driving. Examples of the shape of the road may include a crossroad, a T junction, a Y junction, the number of lanes, and the like. The movement and state of the object detectable by the display control apparatus 5 are not limited to these examples. The movement and state of the object may be detected with any algorithm. For example, the movement and state of the object may be detected on the basis of the position, size, or orientation, or changes therein, of an object in the captured image of one or more frames included in the environment information.

On the basis of at least one of the vehicle information and the environment information acquired from the information output interface 6, the display control apparatus 5 thus detects at least one of movement of the vehicle 4, the state of the vehicle 4, the state of the external environment of the vehicle 4, an object nearby or inside the vehicle 4, movement of the object, and the state of the object. In one of the embodiments, the information output interface 6, instead of the display control apparatus 5, may detect at least one of movement of the vehicle 4, the state of the vehicle 4, the state of the external environment of the vehicle 4, an object nearby or inside the vehicle 4, movement of the object, and the state of the object. In this case, instead of acquiring the vehicle information and the environment information, the display control apparatus 5 may acquire information indicating at least one of movement of the vehicle 4, the state of the vehicle 4, the state of the external environment of the vehicle 4, an object nearby or inside the vehicle 4, movement of the object, and the state of the object from the information output interface 6.

The display control apparatus 5 generates the display control information on the basis of the detection result that is based on at least one of the vehicle information and the environment information. The detection result may include at least one of movement of the vehicle 4, the state of the vehicle 4, the state of the external environment of the vehicle 4, an object nearby or inside the vehicle 4, movement of the object, and the state of the object. The display control apparatus 5 outputs the display control information to the display apparatus 10.

[Operations of Display Apparatus]

The display apparatus 10 displays a variety of information within the driver's field of view through the projection-target member 31 on the basis of the display control information acquired from the display control apparatus 5.

For example, the display apparatus 10 can display an image indicating gauge information, such as the speed of the vehicle 4 and the engine speed, along with the speed limit on the road, at any position within the driver's field of view through the projection-target member 31. This image is also referred to below as a first image. Specifically, the first image may include an image that looks like a speedometer and an image of a number indicating the speed limit, for example.

The display apparatus 10 can, for example, display a marker image suggesting the presence of a predetermined object in the driver's field of view through the projection-target member 31 in overlap with the actual object in the driver's field of view through the projection-target member 31. This marker image is also referred to below as a second image. In the following explanation, displaying an image in overlap with an object may include the case of an image being displayed in overlap with a portion or all of an object or in overlap with an area around an object. Displaying an image in overlap with the object may also include the case of the display position of the image changing to follow an object that can move within the driver's field of view through the projection-target member 31. The position of an object in the driver's field of view through the projection-target member 31 can be calculated on the basis of the driver's position, posture, line of sight, and the like, for example. Examples of the predetermined object may include another vehicle, a pedestrian, or the like. In accordance with display control information, the display apparatus 10 may change the display form, such as the position, size, shape, color, brightness, shading, and the like, of the marker image displayed in overlap on the object.

The display apparatus 10 can, for example, display a suggestion image suggesting the presence of a predetermined object outside the driver's field of view through the projection-target member 31 at any position in the driver's field of view through the projection-target member 31. This suggestion image is also referred to below as a third image. Regions outside the driver's field of view through the projection-target member 31 may, for example, include regions behind the pillars from the driver's perspective, regions to the sides of the vehicle 4, and the like. Examples of the predetermined object may include another vehicle, a pedestrian, or the like.

For example, the display apparatus 10 can display a support image for driving support within the driver's field of view through the projection-target member 31. This support image is also referred to below as a fourth image. Examples of the support image may include an image displaying the outside area to the rear of the vehicle 4, an image suggesting the path of the vehicle 4, an image indicating information related to an object blocked by another vehicle in front, an image warning against collision from turning too sharply, and an image warning against contact from turning too widely.

Examples of images displaying the outside area to the rear of the vehicle 4 may include images from the left-side camera, the right-side camera, the rear camera, and an electrical device for in-direct vision. The image displaying the outside area to the rear of the vehicle 4 is also referred to below as an electronic mirror image.

Examples of images suggesting the path of the vehicle 4 may include an image suggesting the path determined on the basis of at least one of the position information of the vehicle 4 included in the vehicle information, the route information to the destination included in the environment information, and the captured image included in the environment information. Examples of images suggesting the path of the vehicle 4 may also include an image instructing to turn right or left, an image indicating the route to the destination, and an image indicating the lane to be in at an intersection or the like.

The information related to an object blocked by a preceding vehicle may, for example, include an image indicating the state of a traffic signal hidden behind the preceding vehicle.

The display apparatus 10 can display the support image in overlap with a predetermined object included in the driver's field of view through the projection-target member 31. Examples of the predetermined object may include the road, lanes, or the like. In accordance with display control information, the display apparatus 10 may change the display form, such as the position, size, shape, color, brightness, shading, and the like, of the support image displayed in overlap on the object.

Concrete examples are now provided of various information that the display apparatus 10 displays within the driver's field of view through the projection-target member 31 on the basis of the display control information from the display control apparatus 5, as described above.

Figure 14:
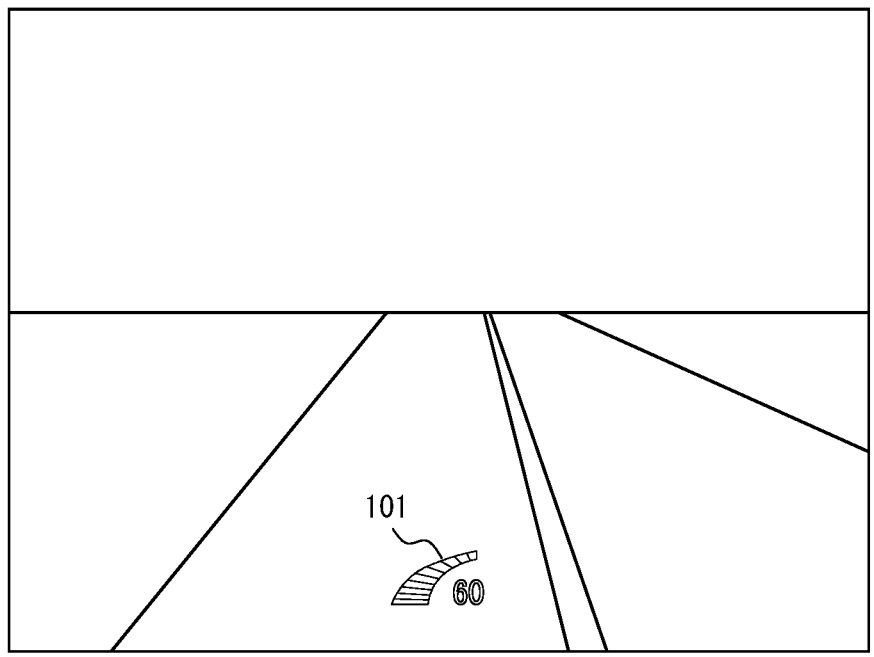
FIG. 14 illustrates a driver's field of view through a projection-target member.

FIG. 14 illustrates the driver's field of view through the projection-target member 31 when the vehicle 4 is driving on a road. In FIG. 14, a speedometer 101 indicating the speed of the vehicle 4 is displayed, for example. The speed limit on the road, for example, may be displayed instead of or along with the speedometer 101.

Figure 15:
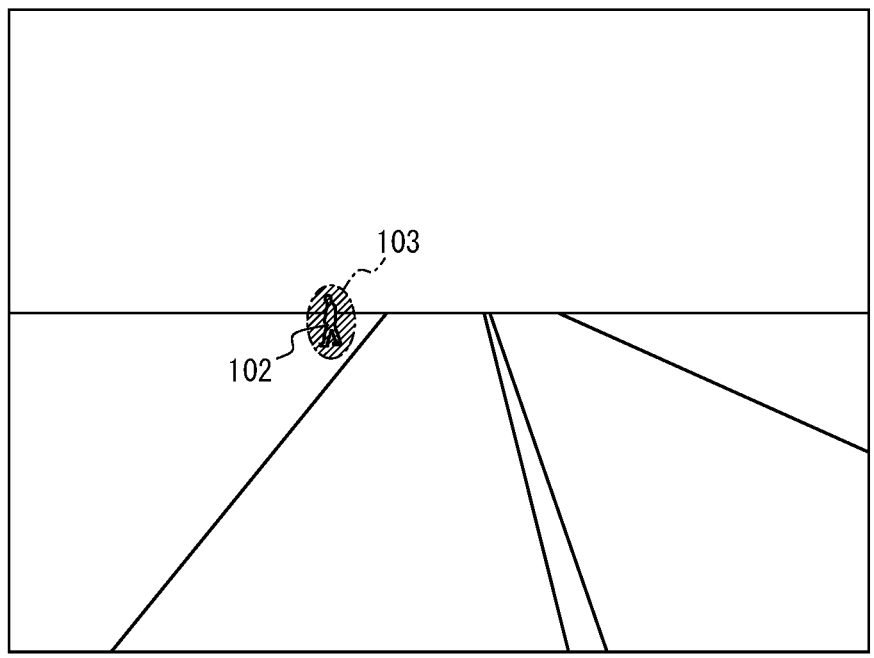
FIG. 15 illustrates the field of view after FIG. 14.

Subsequently, when a pedestrian 102 is detected in the travel direction of the vehicle 4 in the driver's field of view through the projection-target member 31, a marker image 103 is displayed in overlap with the pedestrian 102, as illustrated in FIG. 15. For example, the marker image 103 may be displayed smaller and darker as the distance between the vehicle 4 and the pedestrian 102 is greater. This makes it easier for the driver to notice a pedestrian 102 that is far away. The displayed marker image 103 may, for example, become lighter from the periphery towards the center so that the pedestrian 102 is more visible to the driver. The displayed marker image 103 may, for example, become darker from the periphery towards the center to make the driver aware of the pedestrian 102. The marker image 103 may be displayed in a predetermined display form. Examples of the predetermined display form may include a display form to increase or reduce the marker image 103 in size or to make the marker image 103 blink. The speedometer 101 in FIG. 14 may be temporarily hidden. Temporarily hiding the speedometer 101 can draw the driver's attention to the pedestrian 102.

Figure 16:
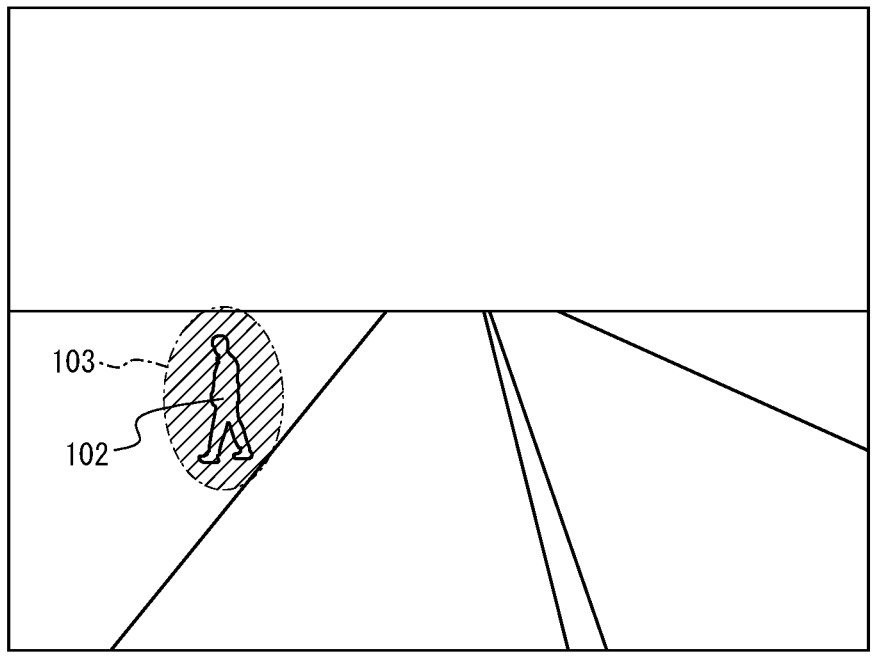
FIG. 16 illustrates the field of view after FIG. 15.

As the pedestrian 102 subsequently draws relatively closer to the vehicle 4, the marker image 103 moves to follow the pedestrian 102, for example as illustrated in FIG. 16. The movement of the marker image 103 makes it easier for the driver to recognize the position of the pedestrian 102 that has approached the vehicle 4. As the pedestrian 102 comes relatively closer to the vehicle 4, the displayed marker image 103 becomes larger and lighter. Displaying the marker image 103 to be larger and lighter makes the pedestrian 102 that has approached the vehicle 4 more visible to the driver.

Figure 17:
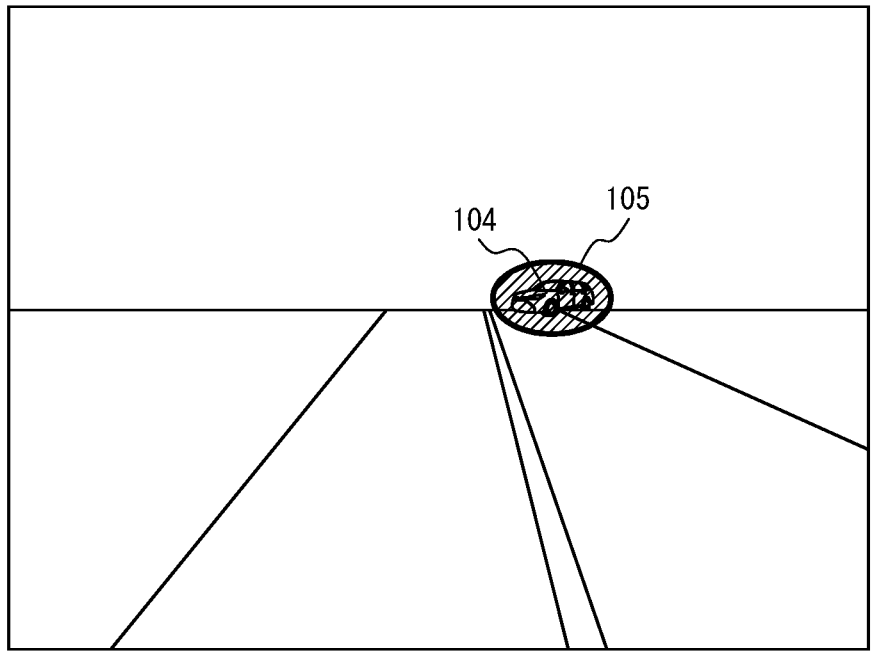
FIG. 17 illustrates a driver's field of view through a projection-target member.

When another vehicle 104 that can enter, or that has entered, the path of the vehicle 4 is detected, a marker image 105 is displayed in overlap on the other vehicle 104, for example as illustrated in FIG. 17. The marker image displayed in overlap on the other vehicle 104 may have a different display form, such as a different color, shape, brightness, or shading, than the marker image 103 displayed in overlap on the pedestrian 102.

Specifically, the display control apparatus 5 in one of the embodiments calculates the predicted path of another vehicle 104 detected in the travel direction of the vehicle 4. The predicted path of the other vehicle 104 may be calculated with any algorithm. For example, the predicted path of the other vehicle 104 may be calculated on the basis of the elliptical shape of the side of the steering wheel, the position, and the orientation of the other vehicle 104 relative to the road in the captured image; the model of the other vehicle 104; and the like. The display control apparatus 5 judges that the other vehicle 104 could enter the path of the vehicle 4 when the path of the vehicle 4 and the predicted path of the other vehicle 104 intersect. The display control apparatus 5 may cause a marker image 105 to be displayed in overlap only on the portion of the other vehicle 104 that could enter, or that has entered, the path of the vehicle 4.

Figure 18:
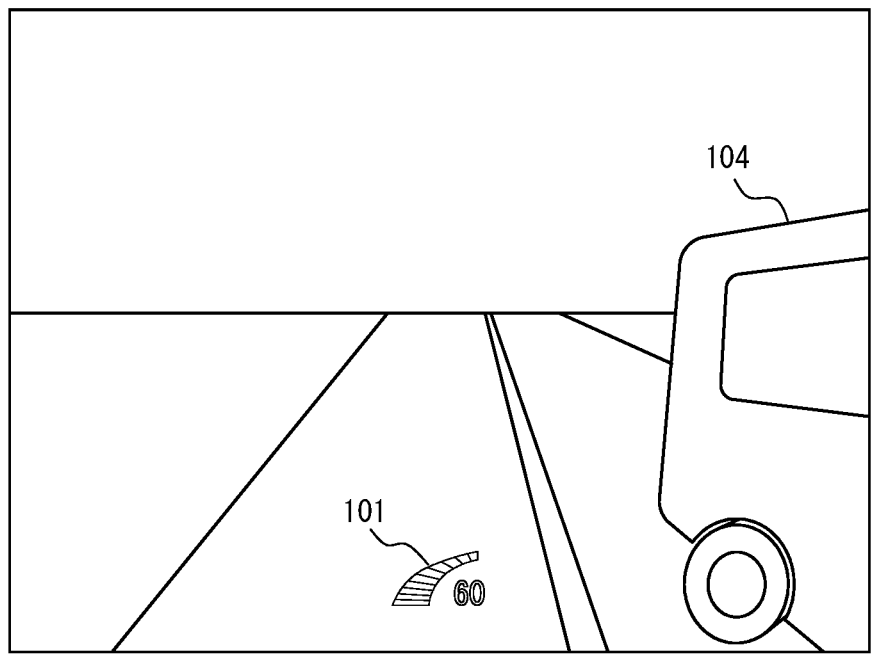
FIG. 18 illustrates the field of view after FIG. 17.

The marker image 105 is hidden when the other vehicle 104 no longer enters the path of the vehicle 4, or when such entry is no longer possible, as illustrated in FIG. 18, for example. A marker image 105 that was displayed in red or yellow to warn of danger, for example, may be hidden after first being changed to blue. A change in the display form of the marker image 105 before the marker image 105 is hidden allows the driver to recognize that the danger has passed. When the marker image 105 is no longer displayed in the driver's field of view through the projection-target member 31, the speedometer 101 that was temporarily hidden may be displayed again, for example.

Figure 19:
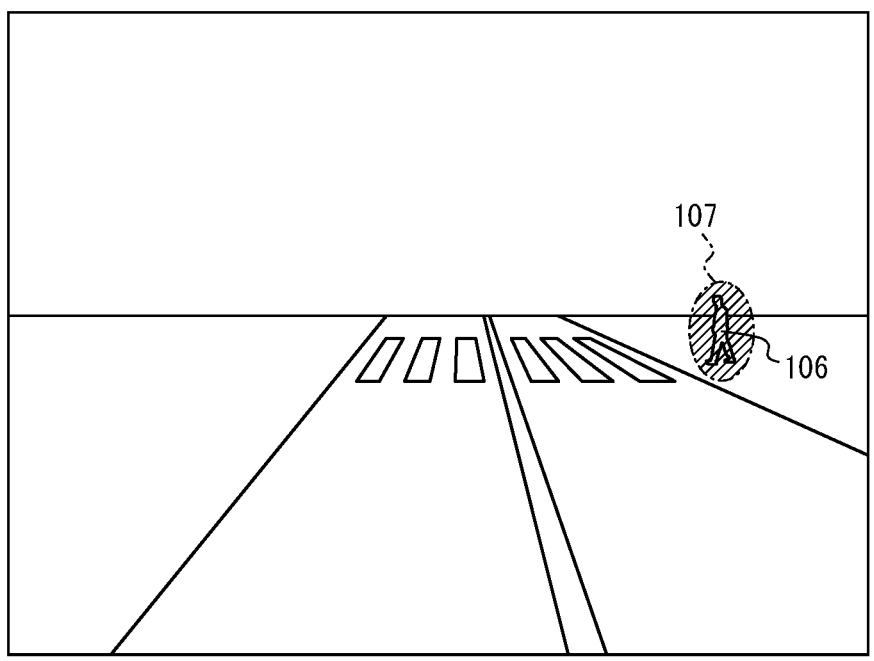
FIG. 19 illustrates a driver's field of view through a projection-target member.

FIG. 19 illustrates the driver's field of view through the projection-target member 31 when the vehicle 4 is driving on a road. A crosswalk and a pedestrian 106 are located within the driver's field of view through the projection-target member 31. A marker image 107 is displayed in overlap on the pedestrian 106 in FIG. 19.

Figure 20:
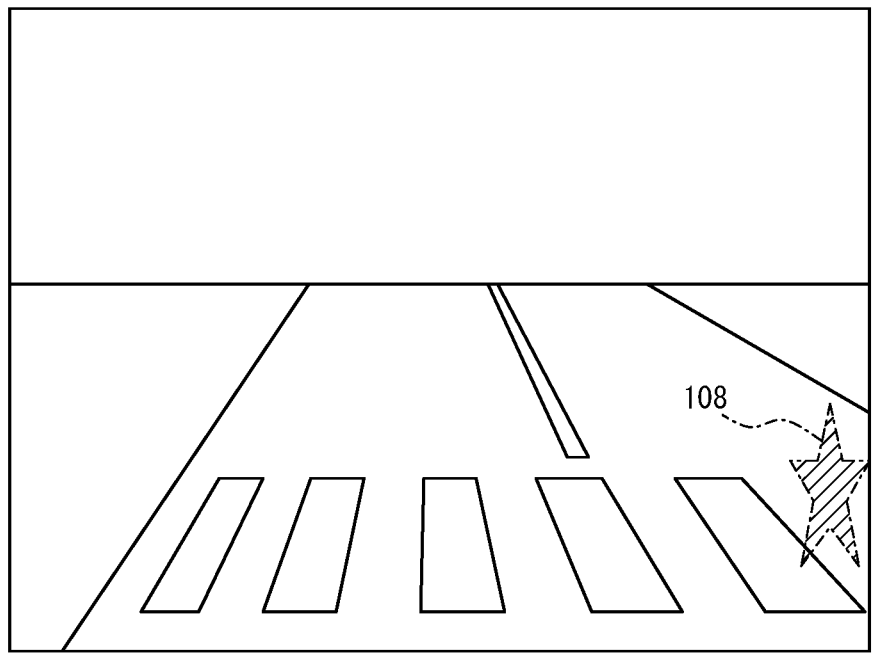
FIG. 20 illustrates the field of view after FIG. 19.

When the vehicle 4 subsequently drives to a location in front of the crosswalk, for example resulting in the pedestrian 106 being behind a pillar from the driver's perspective, then the pedestrian 106 disappears from the driver's field of view through the projection-target member 31. The marker image 107 that was in overlap with the pedestrian 106 is hidden when the pedestrian disappears from the field of view, as illustrated in FIG. 20, for example. A suggestion image 108, for example, suggesting the presence of the pedestrian 106 is displayed at the position of the marker image 107 before being hidden. The position of the marker image 107 before being hidden may be the position of the marker image 107 immediately before being hidden. The suggestion image 108 may be displayed so that the driver can distinguish between the suggestion image 108 and the marker image 107. For example, the suggestion image 108 may be displayed with a different shape than the shape of the marker image 107. The suggestion image 108 may, for example, have a star shape.

Figure 21:
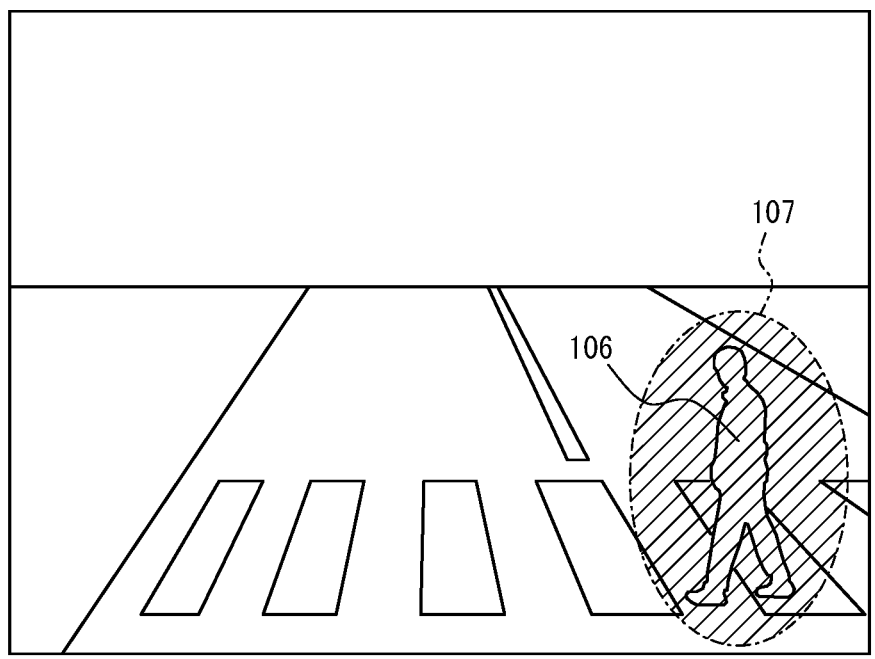
FIG. 21 illustrates the field of view after FIG. 20.

When the pedestrian 106 crossing the crosswalk subsequently reenters the driver's field of view through the projection-target member 31, then as illustrated in FIG. 21, for example, the suggestion image 108 is hidden, and the marker image 107 is displayed again in overlap on the pedestrian 106. When the suggestion image 108 that was displayed in the driver's field of view through the projection-target member 31 switches to the marker image 107, the display form of the suggestion image 108 may be changed sequentially into the marker image 107, for example. This configuration allows the driver to see easily that the object suggested by the suggestion image 108 and the object on which the marker image 107 is overlaid are the same.

Figure 22:
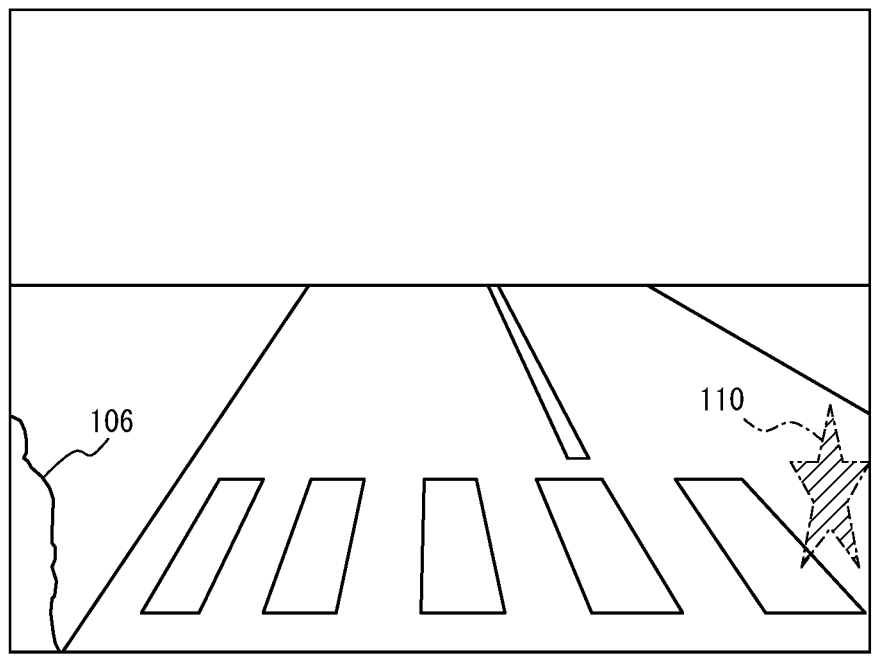
FIG. 22 illustrates the field of view after FIG. 21.

When the pedestrian 106 crossing the crosswalk subsequently reaches the sidewalk on the other side, for example, or moves away from the front of the vehicle 4 or from the path of the vehicle 4, then the marker image 107 is hidden, as illustrated in FIG. 22, for example. On the other hand, when a new pedestrian 109 crossing the crosswalk is detected behind a pillar from the driver's perspective or to the side of the vehicle 4, for example, then a suggestion image 110 suggesting the presence of the pedestrian 109 is displayed.

Figure 23:
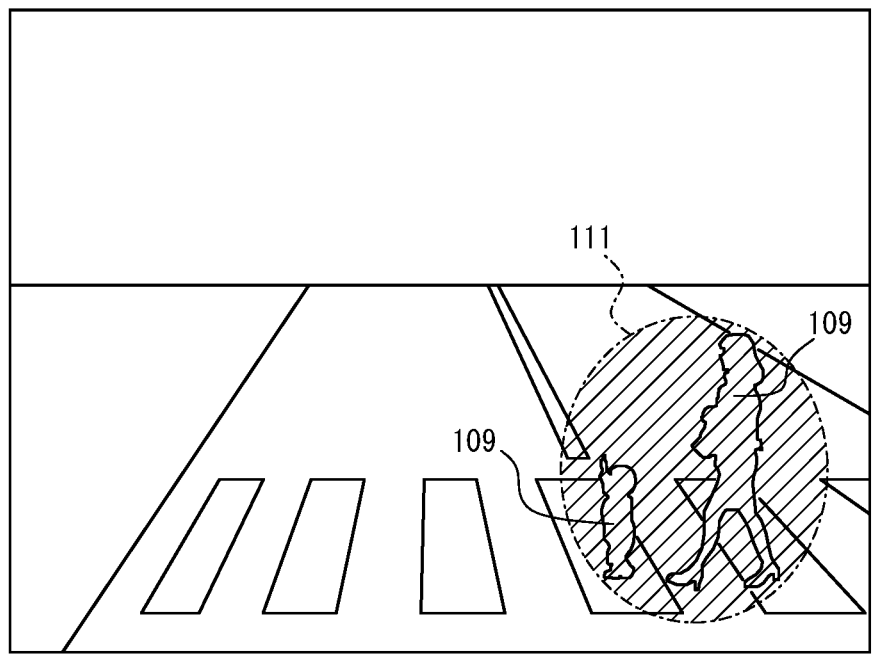
FIG. 23 illustrates the field of view after FIG. 22.

When the new pedestrian 109 crossing the crosswalk subsequently enters the driver's field of view through the projection-target member 31, a marker image 111 is displayed in overlap with the pedestrian 109, as illustrated in FIG. 23, for example. When a plurality of pedestrians 109 crossing the crosswalk in one direction exist within the driver's field of view through the projection-target member 31, one marker image 111 may be displayed in overlap on the plurality of pedestrians 109, or a marker image 111 may be displayed in overlap on each of the pedestrians 109. A marker image 111 may instead be displayed in overlap only on the pedestrian 109 bringing up the rear. Also, a marker image 111 may be displayed in overlap only on the pedestrian 109 at the front and the pedestrian 109 bringing up the rear among the plurality of pedestrians 109.

Figure 24:
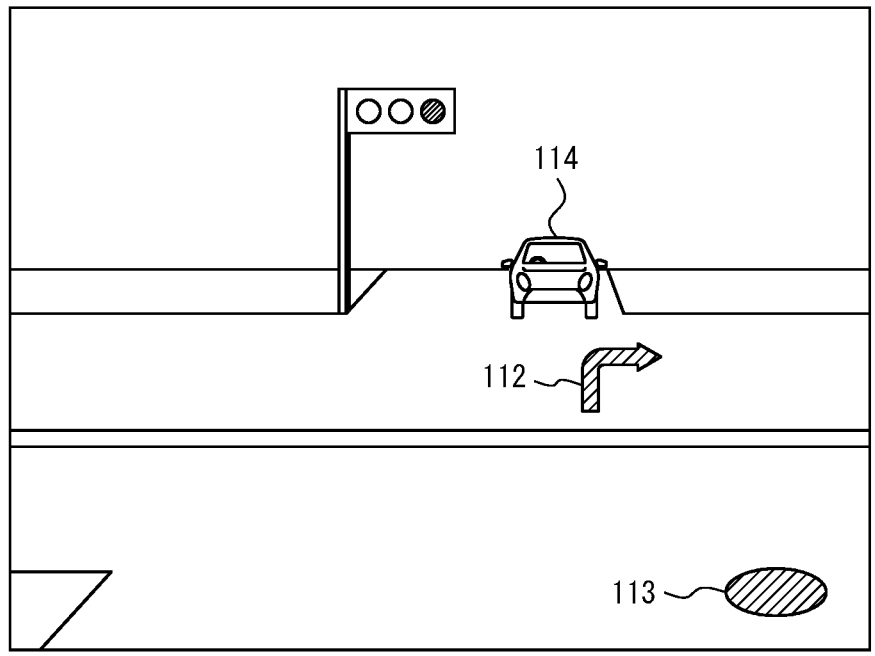
FIG. 24 illustrates a driver's field of view through a projection-target member.

FIG. 24 illustrates the driver's field of view through the projection-target member 31 when the vehicle 4 is waiting to turn right at an intersection with a red light. For example, a support image 112 instructing to turn right and an electronic mirror image 113 indicating the region to the rear right of the vehicle 4 are displayed in accordance with the right turn signal being on. The support image 112 instructing to turn right may, for example, be an image of an arrow bent to the right. The support image 112 instructing to turn right may be displayed in overlap with the lane to enter when turning right. Instead of the support image 112 instructing to turn right, a support image indicating the lane to enter when turning right may be displayed. The support image indicating the lane may, for example, be displayed in overlap on the lane in the driver's field of view through the projection-target member 31. The support image indicating the lane may be displayed as floating above the lane.

Figure 25:
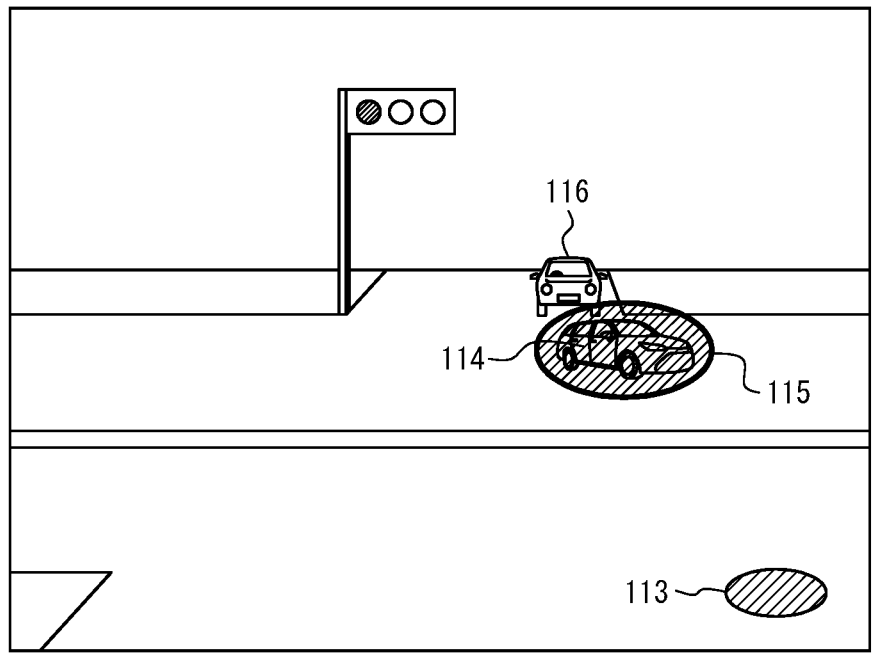
FIG. 25 illustrates the field of view after FIG. 24.
Figure 26:
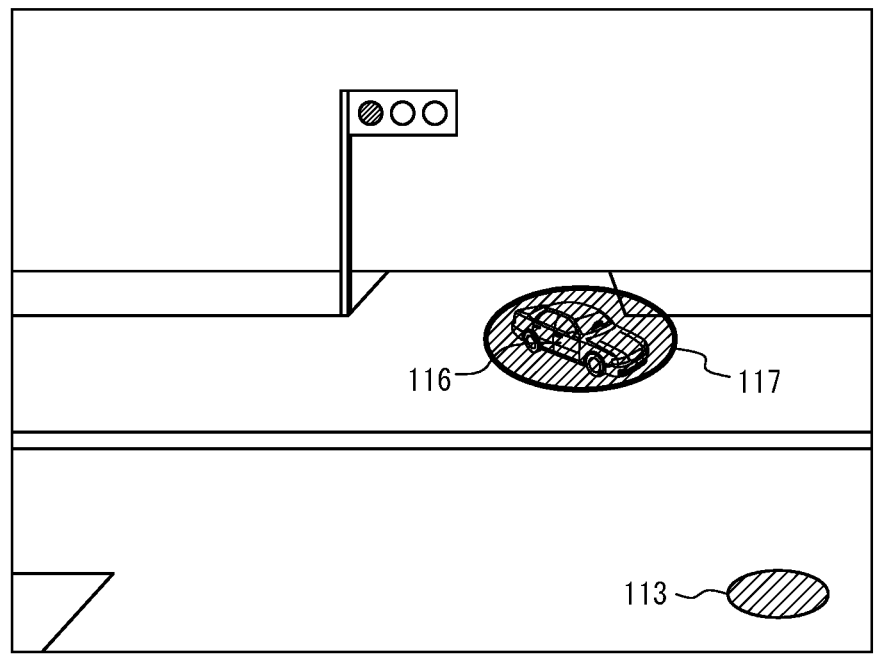
FIG. 26 illustrates the field of view after FIG. 25.

When the red light subsequently changes to green, a marker image 115 is displayed in overlap on an oncoming vehicle 114 that is turning left or traveling straight, as illustrated in FIG. 25, for example. To alert the driver of the oncoming vehicle 114, the support image 112 instructing to turn right in FIG. 24 may be temporarily hidden. After the oncoming vehicle 114 turns left, a marker image 117 is also displayed in overlap on a new oncoming vehicle 116 that is turning left or traveling straight, as illustrated in FIG. 26, for example.

Figure 27:
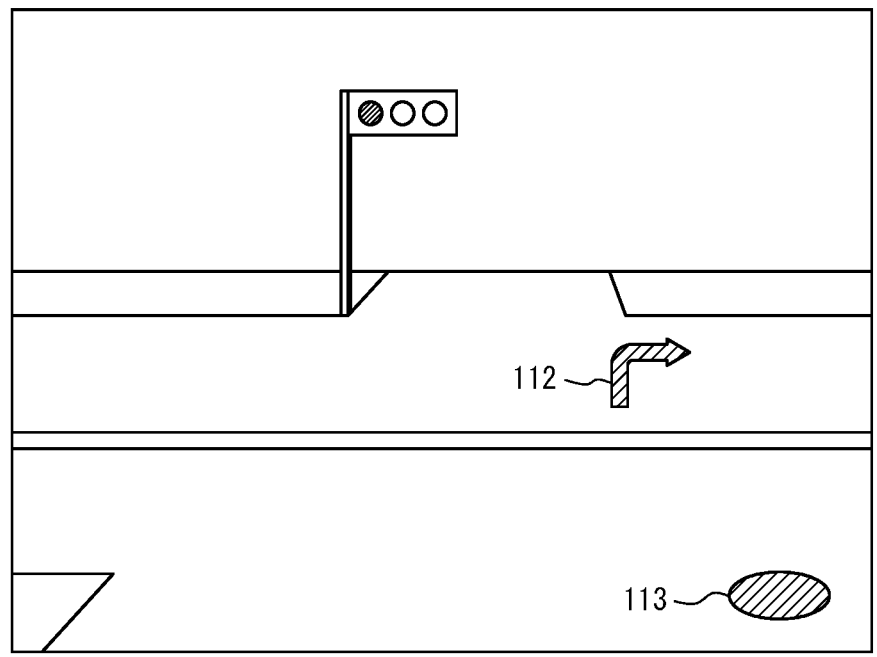
FIG. 27 illustrates the field of view after FIG. 26.

When the new oncoming vehicle 116 subsequently turns left and no other oncoming vehicle is present, for example, the vehicle 4 can turn right. The support image 112 instructing to turn right is displayed again when the vehicle 4 can turn right, as illustrated in FIG. 27, for example.

Figure 28:
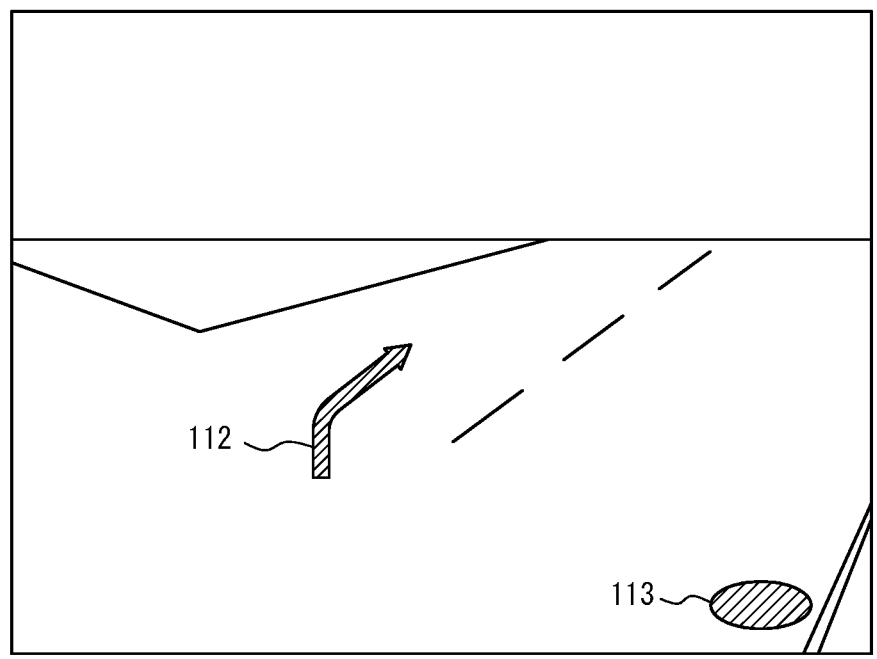
FIG. 28 illustrates the field of view after FIG. 27.

As the vehicle 4 subsequently turns right, the display form, such as the position, size, shape, color, brightness, and shading, of the support image 112 instructing to turn right changes to follow the path in the driver's field of view through the projection-target member 31, as illustrated in FIG. 28, for example. The support image 112 is displayed in overlap on a lane with few vehicles ahead, on the best lane for the route to the destination, or the like when the road after the right turn has a plurality of lanes. Specifically, when the road after the right turn has a "no turn" lane and a "left turn only" lane, and the route to the destination proceeds straight after the right turn, then the "no turn" lane is best lane for the route to the destination. On the other hand, when the route to the destination turns left after the right turn, then the "left turn only" lane is the best lane for the route to the destination.

Figure 29:
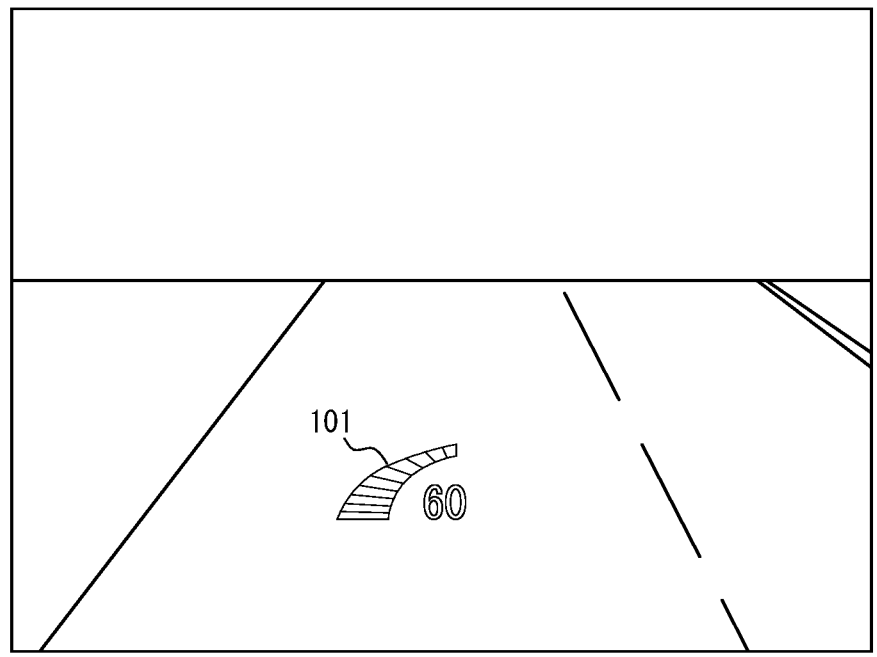
FIG. 29 illustrates the field of view after FIG. 28.

Subsequently, when the right turn signal is turned off and the vehicle 4 completes the right turn, for example, the support image 112 instructing to turn right and the electronic mirror image 113 are hidden, as illustrated in the example in FIG. 29. The speedometer 101 that was temporarily hidden is displayed again.

Figure 30:
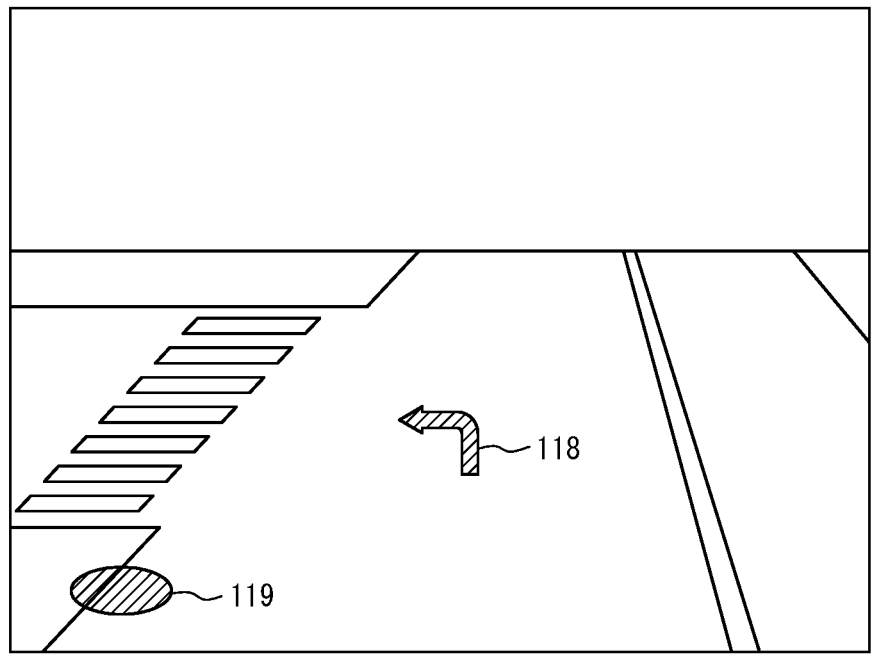
FIG. 30 illustrates a driver's field of view through a projection-target member.

FIG. 30 illustrates the driver's field of view through the projection-target member 31 when the vehicle 4 turns left at an intersection. For example, a support image 118 instructing to turn left and an electronic mirror image 119 indicating the region to the rear left of the vehicle 4 are displayed in accordance with the left turn signal being on. The support image 118 instructing to turn left may, for example, be an image of an arrow bent to the left. The support image 118 instructing to turn left is displayed in the horizontal center of the driver's field of view through the projection-target member 31.

Figure 31:
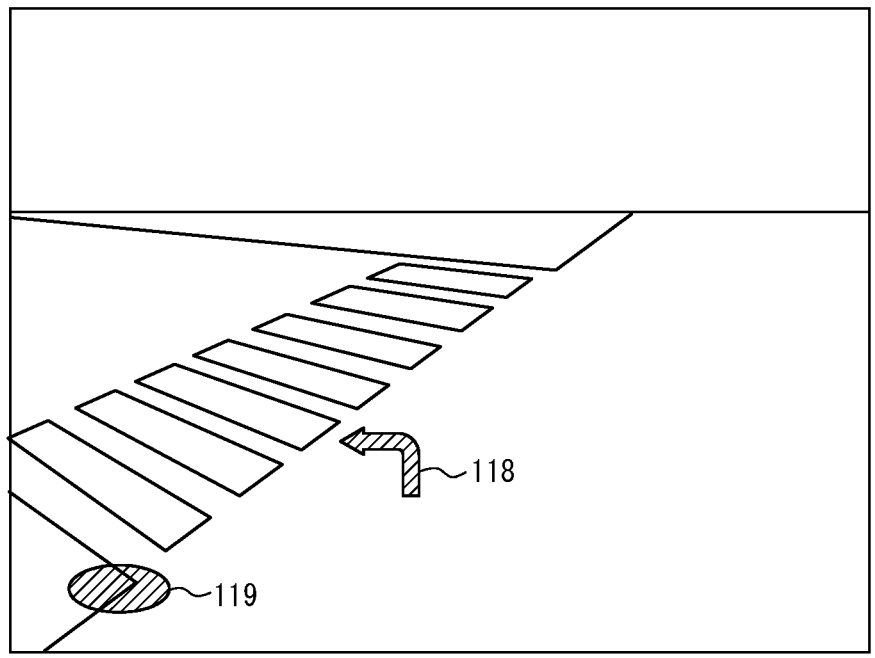
FIG. 31 illustrates the field of view after FIG. 30.

As the vehicle 4 subsequently turns left, the support image 118 instructing to turn left moves from the horizontal center towards the left in the driver's field of view through the projection-target member 31, as illustrated in FIG. 31, for example. The support image 118 may move to be visible in overlap with the road ahead from the driver's perspective.

Figure 32:
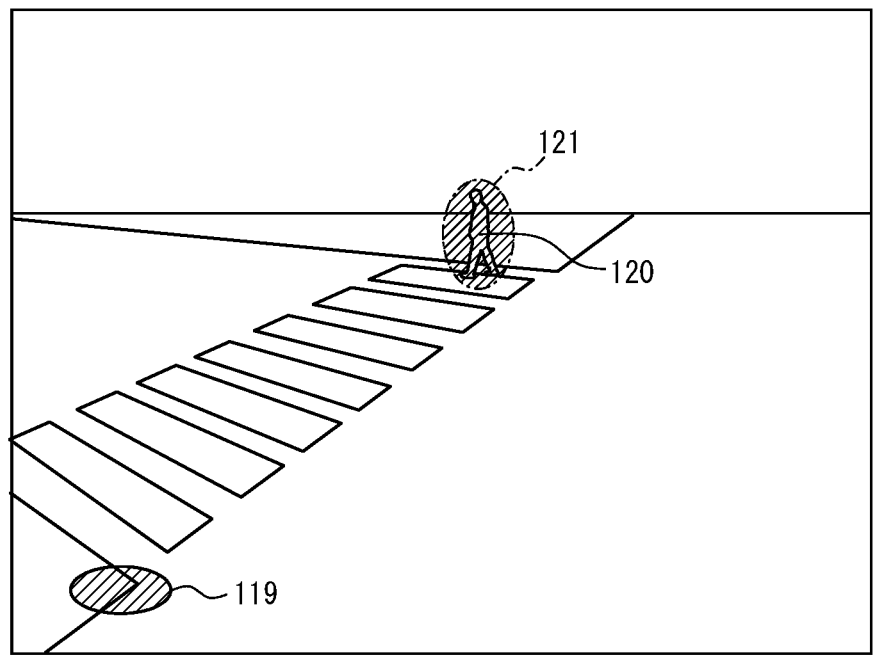
FIG. 32 illustrates the field of view after FIG. 31.

When a pedestrian 120 crossing a crosswalk that cuts across the path of the vehicle 4 is detected, a marker image 121 is displayed in overlap with the pedestrian 120, as illustrated in FIG. 32, for example. The support image 118 instructing to turn left may be temporarily hidden to alert the driver of the pedestrian 120.

Figure 33:
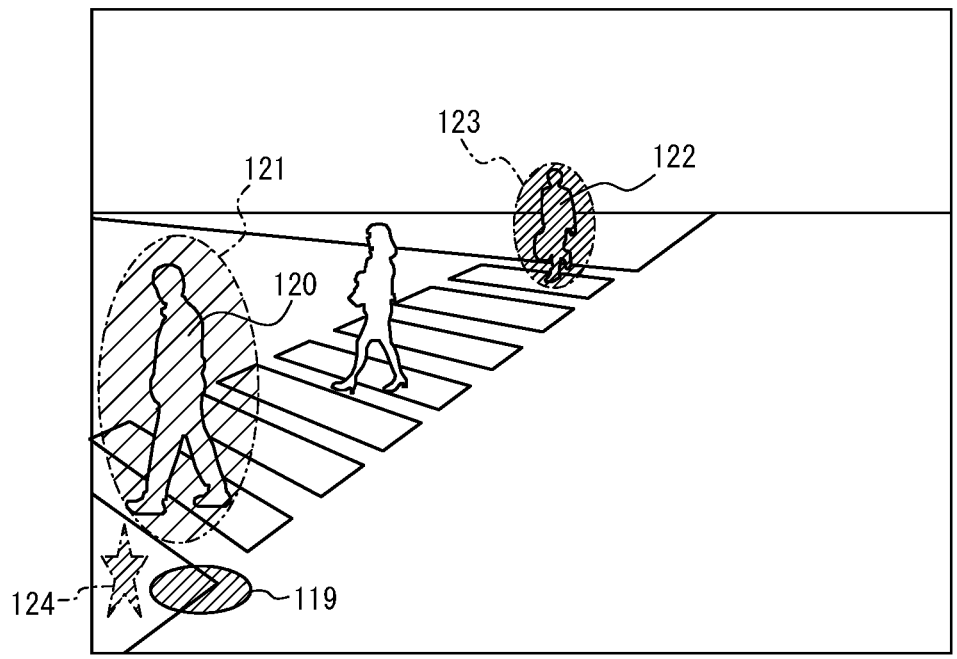
FIG. 33 illustrates the field of view after FIG. 32.

As illustrated in FIG. 33, for example, the display form such as the position, size, shape, color, brightness, shading, and the like of the marker image 121 subsequently changes to follow the pedestrian 120 crossing the crosswalk. When a new pedestrian 122 crossing the crosswalk in the driver's field of view through the projection-target member 31 is detected, a marker image 123 is displayed in overlap with the new pedestrian 122. Among the three people walking forward from the back in the driver's field of view through the projection-target member 31 in FIG. 33, the marker image 121 is displayed in overlap on the pedestrian 120 in the lead, and the marker image 123 is displayed in overlap on the pedestrian 122 bringing up the rear. When a new pedestrian crossing the crosswalk is detected behind a pillar from the driver's perspective or to the left side of the vehicle 4, for example, then a suggestion image 124 suggesting the presence of the pedestrian is displayed. The suggestion image 124 in FIG. 33 has a star shape. The suggestion image 124 is displayed on the left side in the driver's field of view through the projection-target member 31.

Figure 34:
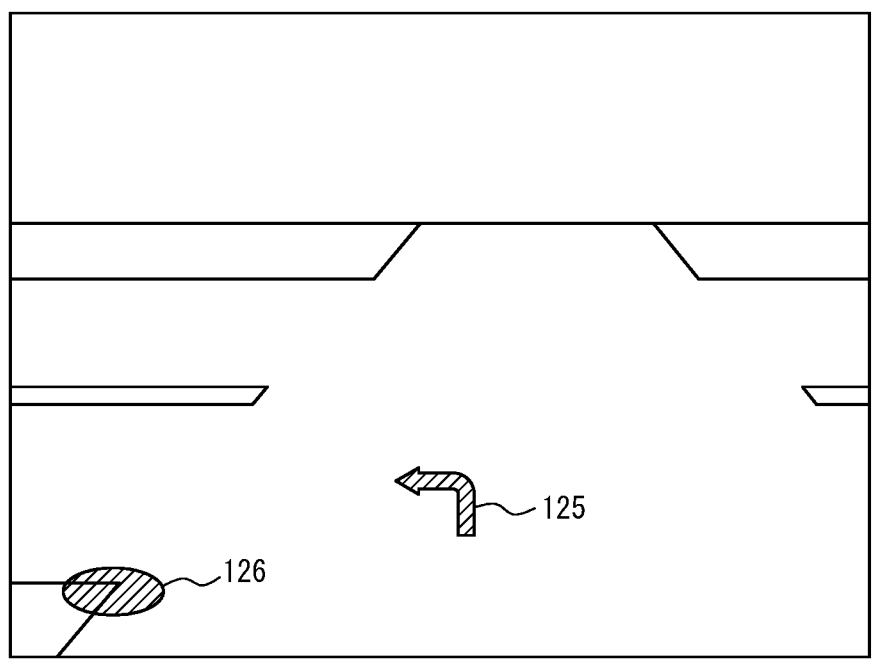
FIG. 34 illustrates a driver's field of view through a projection-target member.

FIG. 34 illustrates the driver's field of view through the projection-target member 31 when the vehicle 4 is about to turn left at a first intersection in front of the vehicle 4. In FIG. 34, as in the above-described example in FIG. 30, a support image 125 instructing to turn left and an electronic mirror image 126 indicating the region to the rear left of the vehicle 4 are displayed.

Figure 35:
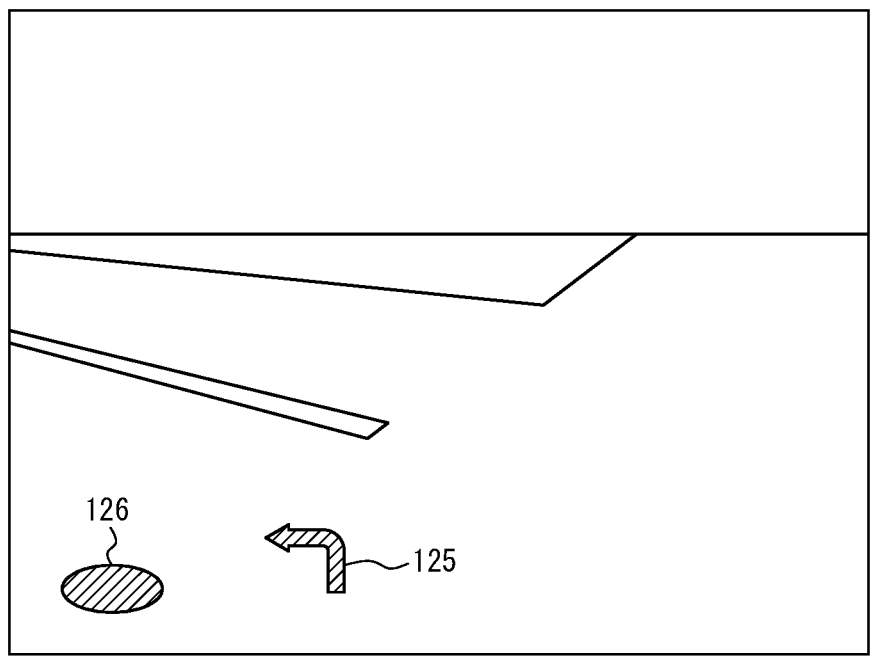
FIG. 35 illustrates the field of view after FIG. 34.

When the vehicle 4 subsequently turns left, the support image 125 instructing to turn left moves from the horizontal center towards the left in the driver's field of view through the projection-target member 31, as illustrated in FIG. 35, for example. The support image 125 may move to be visible in overlap with the road ahead from the driver's perspective.

Figure 36:
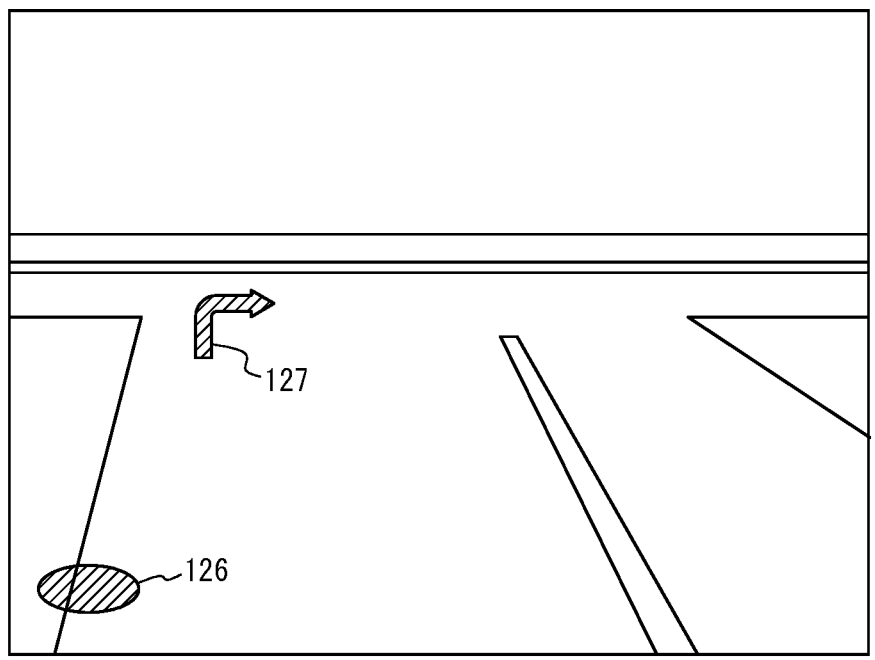
FIG. 36 illustrates the field of view after FIG. 35.

If a second intersection at which the driver should turn right, for example, then enters the driver's field of view through the projection-target member 31 before the left turn at the first intersection is complete, the support image 125 instructing to turn left at the first intersection is hidden, as illustrated in FIG. 36, for example. A support image 127 instructing to turn right at the second intersection is displayed. The support image 127 instructing to turn right may be displayed in overlap with the second intersection, for example. The support image 127 instructing to turn right may, for example, be displayed near the position at which the support image 125 instructing to turn left at the first intersection was displayed before being hidden. The position of the support image 125 before being hidden may be the position of the support image 125 immediately before being hidden. The support image 127 instructing to turn right may be displayed to the left of the horizontal center of the driver's field of view through the projection-target member 31 and then moved to the right. The support image 127 may move to be in overlap with the road ahead from the driver's perspective. This configuration displays the support image 127 instructing to turn right at the second intersection near the line of sight of the driver, who was looking at the support image 125 instructing to turn left at the first intersection. Hence, the probability of the driver seeing the support image 127 instructing to turn right at the second intersection increases.

Figure 37:
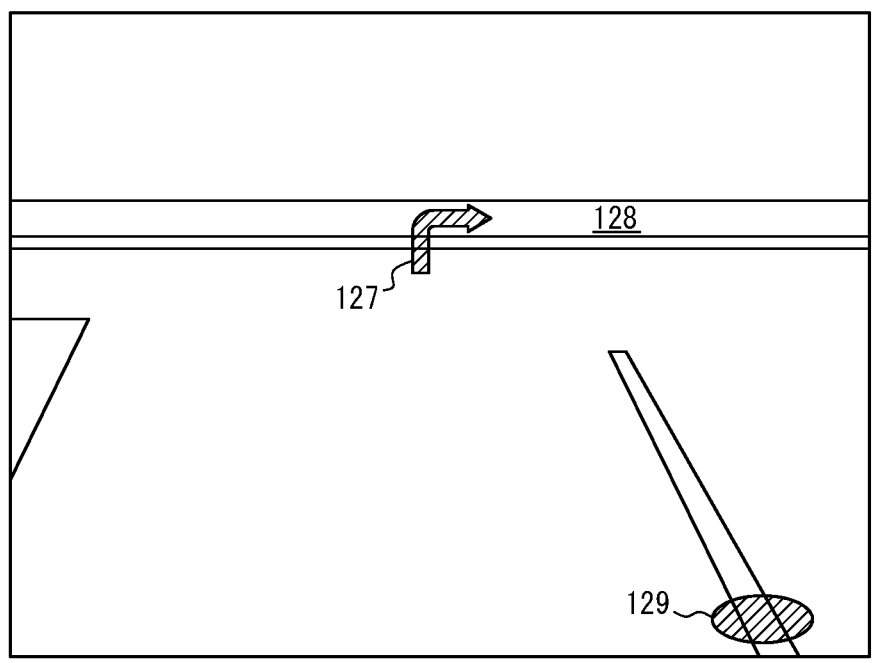
FIG. 37 illustrates the field of view after FIG. 36.

After the left turn at the first intersection is complete and the vehicle 4 advances to be immediately in front of the second intersection, the display form such as the position, size, shape, color, brightness, shading, and the like of the support image 127 instructing to turn right changes to follow the path in the driver's field of view through the projection-target member 31, as illustrated in FIG. 37, for example. The support image 127 instructing to turn right is displayed in FIG. 37 in overlap with a lane to enter 128 when turning right at the second intersection. For example, an electronic mirror image 129 indicating the region to the rear right of the vehicle 4 is displayed in accordance with the right turn signal being on.

Figure 38:
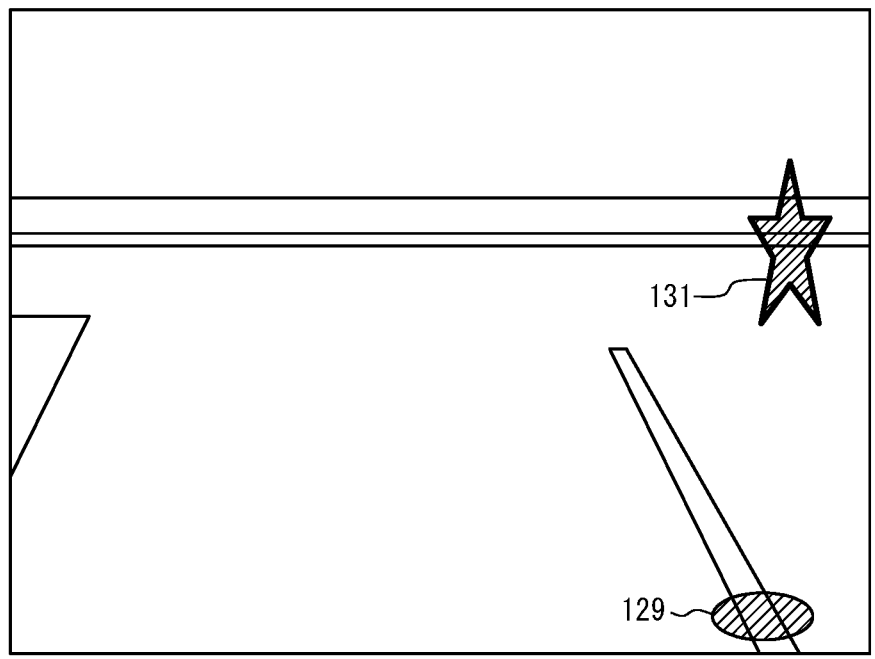
FIG. 38 illustrates the field of view after FIG. 37.

Subsequently, when another vehicle 130 entering the second intersection from the side is detected behind a pillar from the driver's perspective or to the side of the vehicle 4, a suggestion image 131 suggesting the presence of the other vehicle 130 is displayed. For example, in FIG. 38, a suggestion image 131 suggesting the presence of the other vehicle 130 entering the second intersection from the right is displayed to the right of the horizontal center in the driver's field of view through the projection-target member 31. The support image 127 instructing to turn right may be temporarily hidden to alert the driver of the other vehicle 130.

Figure 39:
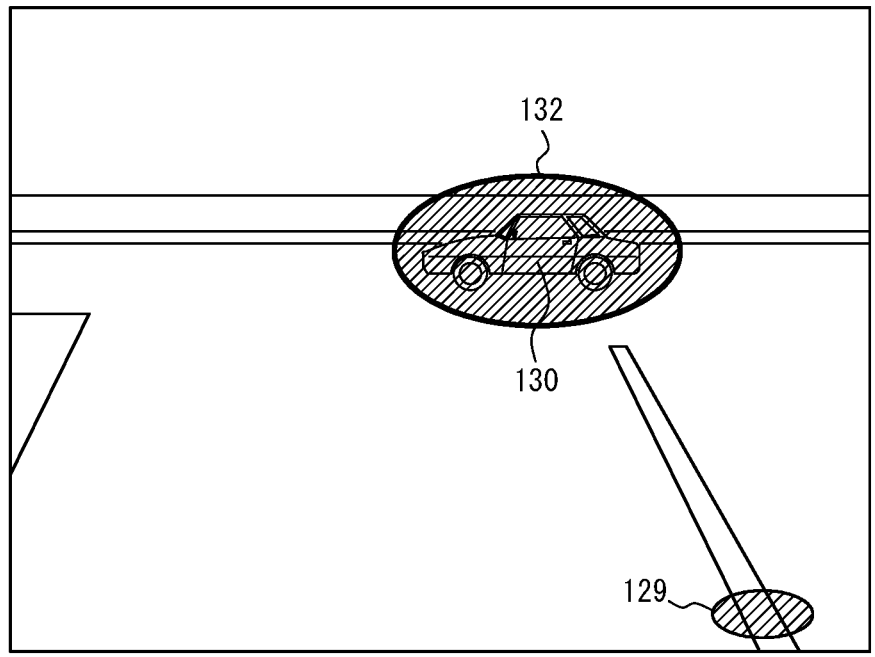
FIG. 39 illustrates the field of view after FIG. 38.

When the other vehicle 130 entering the second intersection subsequently enters the driver's field of view through the projection-target member 31, then as illustrated in FIG. 39, for example, the suggestion image 131 is hidden, and a marker image 132 is displayed in overlap on the other vehicle 130.

Figure 40:
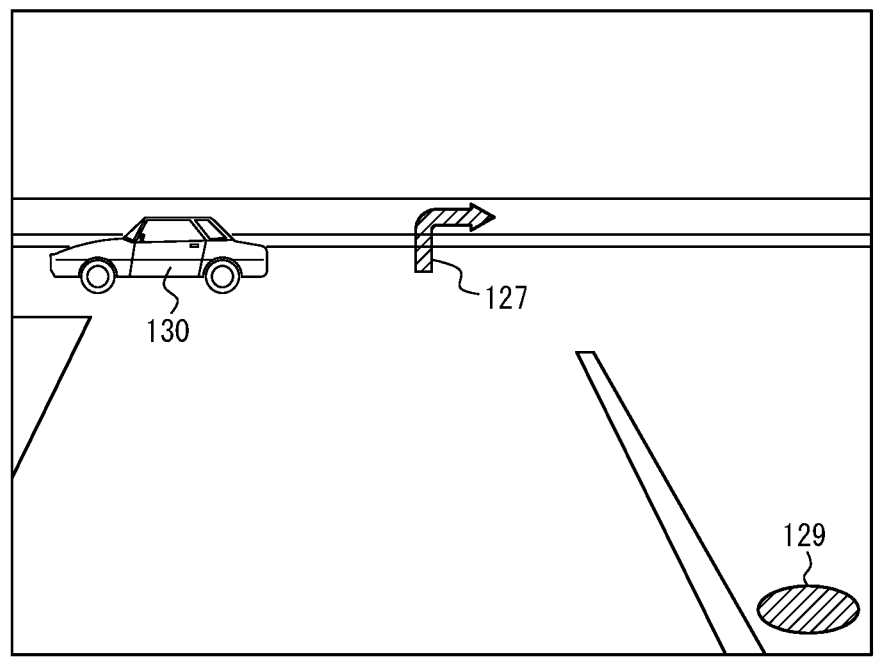
FIG. 40 illustrates the field of view after FIG. 39.

When the other vehicle 130 passes through the second intersection, for example, or moves away from the front of the vehicle 4 or from the path of the vehicle 4 that is to turn right, then the marker image 132 is hidden, as illustrated in FIG. 40, for example. The temporarily hidden support image 127 instructing to turn right is then displayed again.

Figure 41:
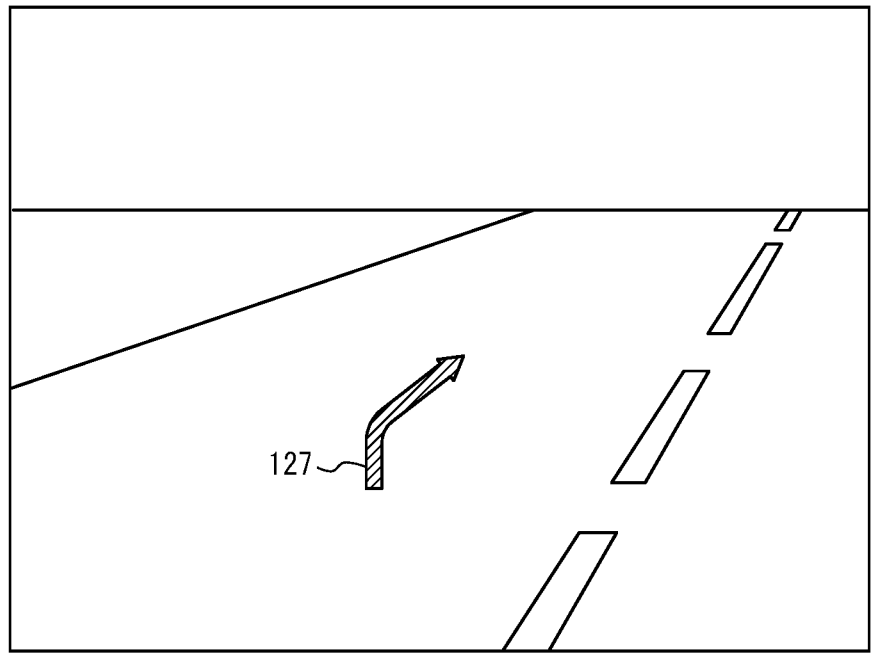
FIG. 41 illustrates the field of view after FIG. 40.

As the vehicle 4 subsequently turns right, the display form, such as the position, size, shape, color, brightness, and shading, of the support image 127 instructing to turn right changes to follow the path in the driver's field of view through the projection-target member 31. In FIG. 41, for example, the direction of the arrow in the support image 127 instructing to turn right changes to substantially match the direction of the path.

Figure 42:
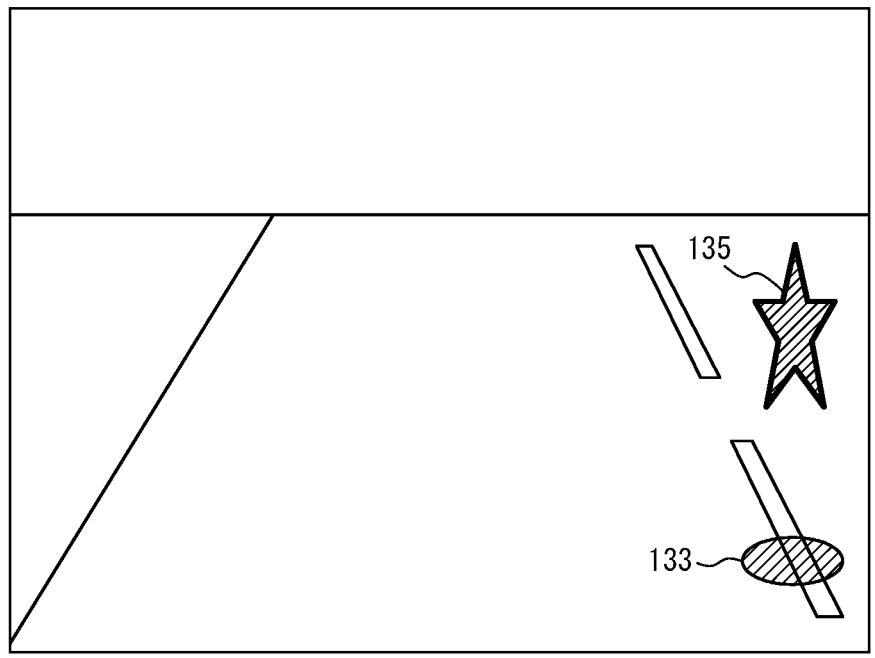
FIG. 42 illustrates a driver's field of view through a projection-target member.

FIG. 42 illustrates the driver's field of view through the projection-target member 31 when the vehicle 4 changes lanes from the left lane to the right lane while driving on a road with two lanes in one direction. For example, an electronic mirror image 133 indicating the region to the rear right of the vehicle 4 may be displayed in accordance with the right turn signal being on, or in accordance with detection of an obstacle ahead in the left lane. When another vehicle 134 in the right lane is detected behind a pillar from the driver's perspective or to the right side of the vehicle 4, a suggestion image 135 suggesting the presence of the other vehicle 134 is displayed. The suggestion image 135 is displayed to the right of the horizontal center in the driver's field of view through the projection-target member 31, for example, or in overlap with the right lane in the driver's field of view through the projection-target member 31.

Figure 43:
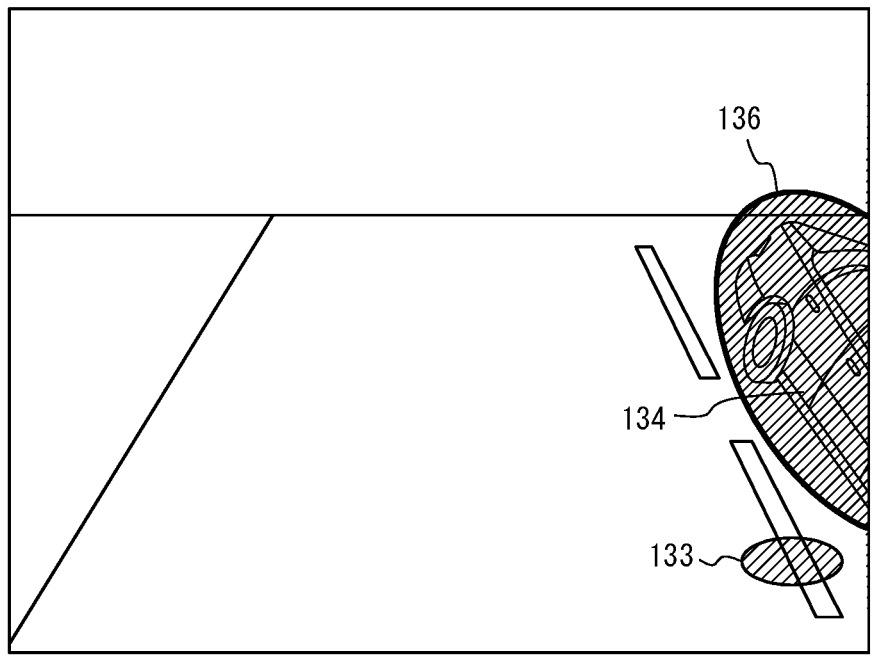
FIG. 43 illustrates the field of view after FIG. 42.

When the other vehicle 134 in the right lane subsequently enters the driver's field of view through the projection-target member 31, then as illustrated in FIG. 43, for example, the suggestion image 135 is hidden, and a marker image 136 is displayed in overlap on the other vehicle 134.

Figure 44:
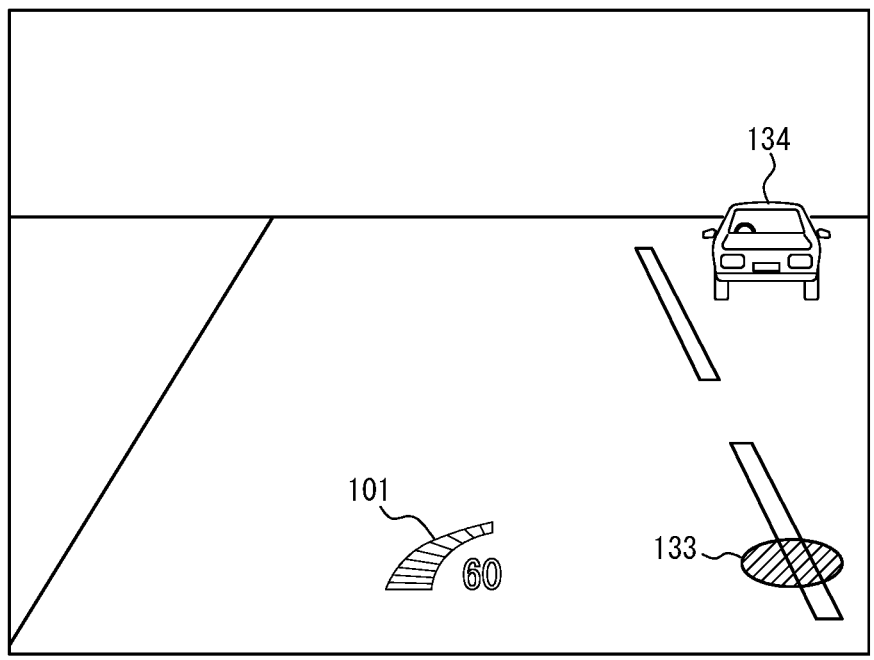
FIG. 44 illustrates the field of view after FIG. 43.

When the other vehicle 134 in the right lane separates from the vehicle 4 by at least a certain distance, for example, or moves away from the path of the vehicle 4 that is to change lanes, then the marker image 136 is hidden, as illustrated in FIG. 44, for example. When the marker image 136 is no longer displayed in the driver's field of view through the projection-target member 31, the speedometer 101 may be displayed, for example.

Figure 45:
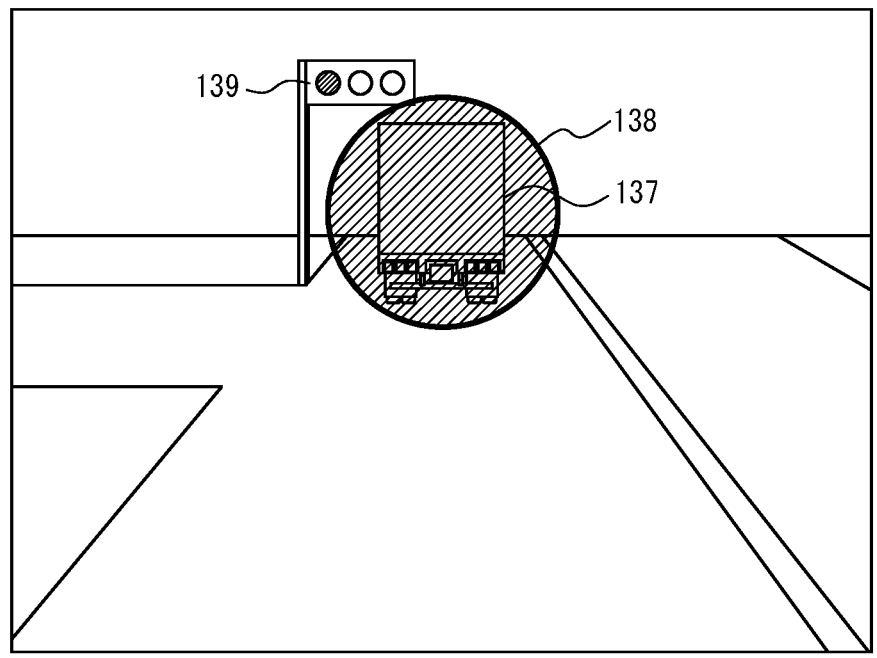
FIG. 45 illustrates a driver's field of view through a projection-target member.

FIG. 45 illustrates the driver's field of view through the projection-target member 31 when the vehicle 4 is driving behind a preceding vehicle 137. When, for example, the preceding vehicle 137 is a large-sized vehicle, such as a truck, a portion of the driver's field of view through the projection-target member 31 may be blocked by the preceding vehicle 137. A marker image 138 is displayed in overlap with the preceding vehicle 137 when a portion of the driver's field of view is blocked. Information related to an object in the region blocked by the preceding vehicle 137 can be displayed within the driver's field of view through the projection-target member 31. When a nearby preceding vehicle is decelerating, a warning indicating that the preceding vehicle is decelerating may be displayed along with the display of information related to an object in the blocked region. Details are provided below.

In FIG. 45, a first traffic signal 139 visible to the driver within the driver's field of view through the projection-target member 31 is green. Suppose that a second traffic signal that is hidden behind the preceding vehicle 137 and is not visible to the driver is red, and that the preceding vehicle 137 is gradually decelerating. The vehicle 4 detects that the second traffic signal is red on the basis of vehicle to infrastructure communication with the second traffic signal or vehicle to vehicle communication with the preceding vehicle 137, for example.

The support image 140 indicating that the second traffic signal, which the driver cannot see, is red may be displayed within the driver's field of view through the projection-target member 31. The driver may, however, be confused if the support image 140 indicating that the second traffic signal is red is displayed within the driver's field of view through the projection-target member 31 despite the first traffic signal 139 being green, for example. To address this, the display of the support image 140 is suspended in the present embodiment as long as the first traffic signal 139 is visible in the driver's field of view through the projection-target member 31, as illustrated in FIG. 45, for example.

This configuration reduces the probability of the driver being confused by the display of the support image 140.

Figure 46:
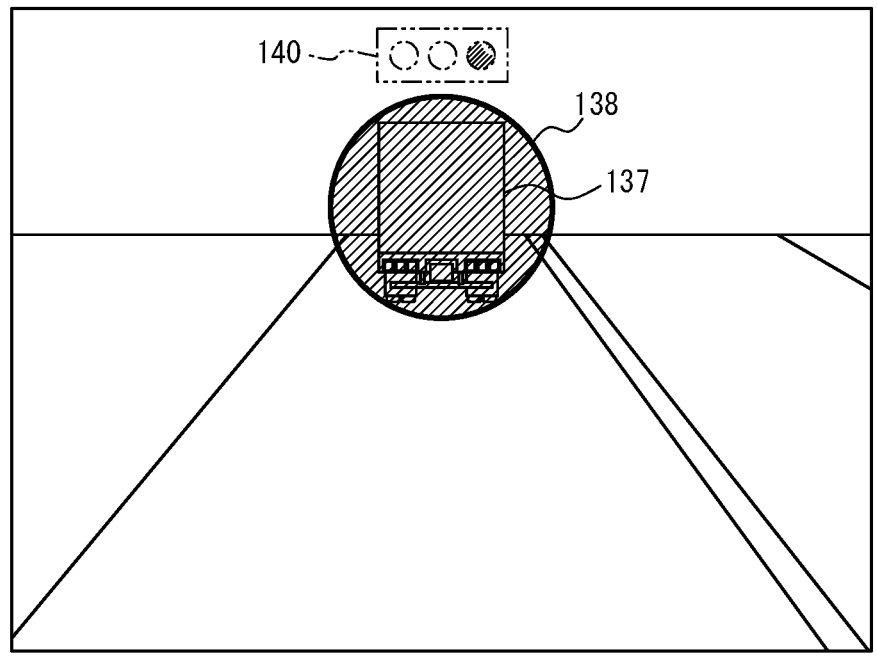
FIG. 46 illustrates the field of view after FIG. 45.

Subsequently, when the vehicle 4 and the preceding vehicle 137 move forward, the first traffic signal 139 can move away from the driver's field of view through the projection-target member 31. The display of the support image 140 is no longer suspended when the first traffic signal 139 moves away from the field of view, and the support image 140 is displayed as illustrated in FIG. 46, for example. In FIG. 46, the support image 140 is an image that looks like a red light. The support image 140 is displayed near the marker image 138. The appearance and display position of the support image 140 may, however, be freely determined.

Figure 47:
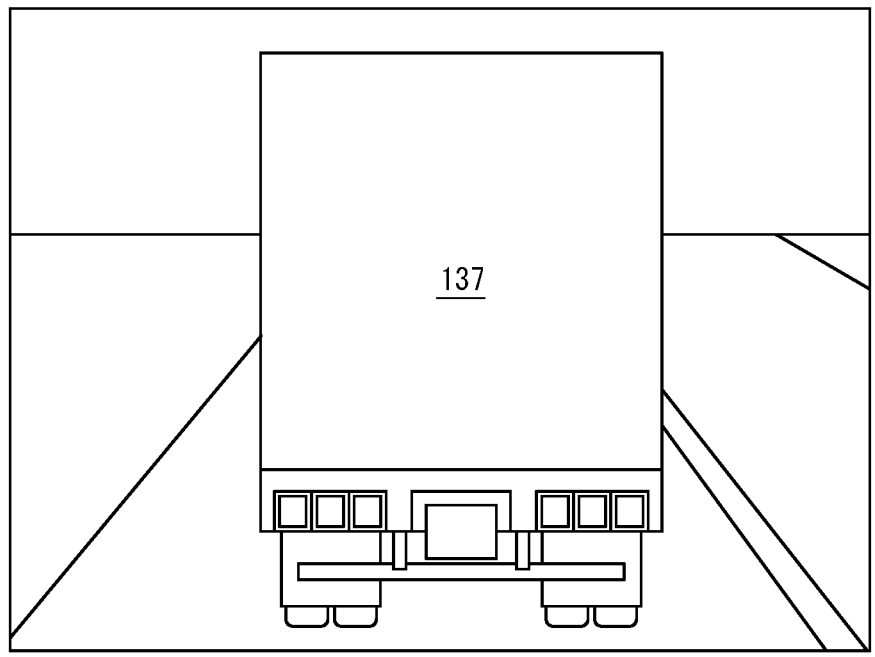
FIG. 47 illustrates the field of view after FIG. 46.

When the vehicle 4 and the preceding vehicle 137 stop, the marker image 138 and the support image 140 are hidden as illustrated in FIG. 47, for example. When the second traffic signal subsequently turns green, for example, a support image indicating that the second traffic signal is green may be displayed. Alternatively, the support image 140 may continue to be displayed even when the vehicle 4 and the preceding vehicle 137 stop. In this case, the support image 140 that looks like a red light may change to an image that looks like a green light when the second traffic signal changes to green.

Figure 48:
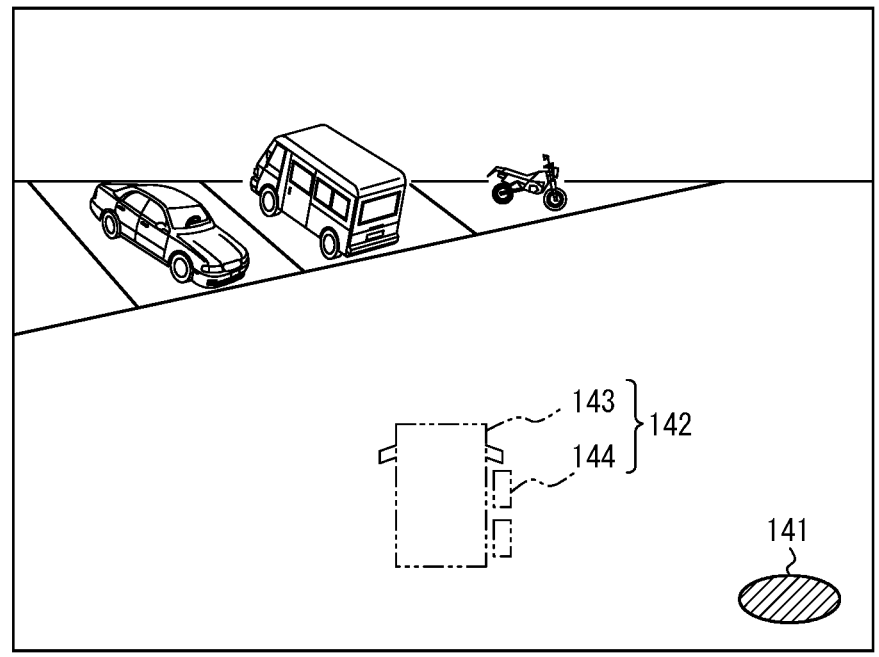
FIG. 48 illustrates a driver's field of view through a projection-target member.

FIG. 48 illustrates the driver's field of view through the projection-target member 31 when the vehicle 4, which was parked in a parking lot, starts to move while turning right. For example, an electronic mirror image 141 indicating the region to the rear right of the vehicle 4 is displayed in accordance with the right turn signal being on. A support image 142 warning against collision on the right side of the vehicle 4 is displayed in accordance with detection of an object with which the vehicle 4 might collide by turning too sharply. Examples of the object with which the vehicle 4 might collide may include a pedestrian, another vehicle in the parking lot, a curb, a guardrail, or a telephone pole located within a predetermined distance from the vehicle 4. In FIG. 48, for example, the support image 142 includes an image 143 indicating the shape of the vehicle 4 and an image 144 indicating the right side of the vehicle 4 where collision could occur.

Examples of various images displayed by the display apparatus 10 have been described, but the information displayed by the display apparatus 10 is not limited to these examples.

Operations by the display apparatus 10, the display control apparatus 5, and the information output interface 6 are described with reference to FIG. 49. These operations may, for example, be executed periodically or at predetermined times.

Step S200: the information output interface 6 outputs vehicle information and environment information to the display control apparatus 5.

Step S201: the display control apparatus 5 acquires the vehicle information and the environment information transmitted in step S200.

Step S202: on the basis of at least one of the vehicle information and the environment information, the display control apparatus 5 detects at least one of movement of the vehicle 4, the state of the vehicle 4, the state of the external environment of the vehicle 4, an object nearby or inside the vehicle 4, movement of the object, and the state of the object. The display control apparatus 5 generates display control information on the basis of the detection result.

Step S203: the display control apparatus 5 outputs the display control information generated in step S202 to the display apparatus.

Step S204: the display apparatus 10 acquires the display control information transmitted in step S203.

Step S205: the display apparatus 10 displays a variety of information within the driver's field of view through the projection-target member 31 on the basis of the display control information.

As described above, the display control apparatus 5 according to the present embodiment generates the display control information on the basis of at least one of the vehicle information and the environment information acquired from the information output interface 6. By transmitting the display control information to the display apparatus 10, the display control apparatus 5 causes a variety of information to be displayed within the driver's field of view through the projection-target member 31. The display form, such as the position, size, shape, color, brightness, and shading, of the displayed information changes in accordance with at least one of the vehicle information and the environment information. This configuration allows a variety of information to be presented to the driver using a display form in accordance with vehicle information and environment information that change over time. The display system 1 is therefore more convenient.

The present disclosure is based on the drawings and on embodiments, but it should be noted that a person of ordinary skill in the art could easily make a variety of modifications and adjustments on the basis of the present disclosure. Therefore, such changes and modifications are to be understood as included within the scope of the present disclosure. For example, the functions and the like included in the various means and steps may be reordered in any logically consistent way. Furthermore, means and steps may be combined into one or divided.

The invention claimed is:

1. A display apparatus comprising:
   an image projector configured to emit image projection light that projects an image onto a projection-target surface; and
   a controller configured to control, in a time division manner, an emission direction of the image projection light emitted by the image projector, and to prevent a sum of an area of one or more regions of the projection-target surface, on which the image projection light is projected, from exceeding a predetermined upper limit.

2. The display apparatus of claim 1, wherein when the controller is further configured to project image projection light onto two or more regions of the projection-target surface, further wherein the controller controls an emission time of the image projection light in one cycle of the time division to be longer in one of the regions than in other regions when an optical path of the image projection light to the one of the regions is longer.

3. The display apparatus of claim 1, wherein the controller is configured to control an intensity of image projection light emitted from the image projector and to increase the intensity of the image projection light when an optical path of the image projection light to one of the regions is longer.

4. The display apparatus of claim 1, wherein the image projector comprises:
   an image generator configured to generate the image;
   a magnifying optical system configured to project the image onto the projection-target surface; and
   a drive unit configured to change a relative position of the image generator and the magnifying optical system.

5. The display apparatus of claim 1, wherein the image projector comprises:
   a light source configured to emit a light beam;

a scanning unit configured to scan the light beam emitted from the light source;

an intermediate image plane on which the light beam scanned by the scanning unit forms the image; and a magnifying optical system configured to project the image onto the projection-target surface, further wherein the controller controls the scanning unit to display the image in one or more regions of the intermediate image plane.

6. The display apparatus of claim 1, wherein the controller executes control in the time division manner in a cycle of 30 times or more per second.

7. A display system comprising:
a projection-target member;
an image projector configured to emit image projection light that projects an image to the projection-target member; and
a controller configured to control, in a time division manner, an emission direction of the image projection light emitted by the image projector;
wherein the controller is further configured to prevent a sum of an area of the one or more regions of the projection-target member, on which the image projection light is projected, from exceeding a predetermined upper limit.

8. The display system of claim 7, wherein the a projection-target member configured to reflect at least a portion of light and
the image projector emits image projection light that projects an image and to cause the image projection light to be reflected by one or more regions of the projection-target member to display the image as a virtual image in a field of view of a user.

9. The display system of claim 8, wherein at least a portion of the projection-target member is a reflection angle control member configured to reflect at least a portion of the image projection light towards the field of view of the user at a different angle from specular reflection.

10. The display system of claim 7, wherein the projection-target member at least partially transmits light, and the image projector displays the image in overlap with a background of real space transmitted by the projection-target member.

11. The display system of claim 10, wherein the controller is further configured to determine a brightness of the background, and
to determine the predetermined upper limit on the sum of the area of the one or more regions of the projection-target member based on the brightness of the background.

12. The display system of claim 7, wherein the image projector comprises an image generator configured to generate the image;
a magnifying optical system configured to project the image onto the projection-target member, and
a drive unit configured to drive the image generator relative to the magnifying optical system.

13. The display system of claim 7, wherein the image projector comprises a light source configured to emit a light beam;
a scanning unit configured to scan the light beam emitted from the light source;
an intermediate image plane on which the light beam scanned by the scanning unit forms the image; and
a magnifying optical system configured to project the image onto the projection-target member, wherein the controller controls the scanning unit to display the image in one or more regions of the intermediate image plane.

14. The display system of claim 7, wherein the controller executes control in the time division manner in a cycle of 30 times or more per second.

15. The display system of claim 7, further comprising:
a display control apparatus configured to generate control information based on at least one of moveable body information related to the moveable body and environment information related to an environment of the moveable body; and
a display apparatus configured to, based on the control information, at least one of display a support image suggesting a path of the moveable body and cause a marker image suggesting presence of a predetermined object in a field of view of a driver to be displayed within a field of view of a driver,
wherein the control information includes information for changing a display position of at least one of the support image and the marker image.

16. The display system of claim 15,
wherein at least one of the support image and the marker image is displayed in overlap with a portion of or all of a first object or the object in the field of view of the driver or in overlap with an area around the first object or the object; and
wherein the display position of the support image or the marker image in the field of view of the driver changes to follow a position of the first object or the object in the field of view of the driver.

17. The display system of claim 16, further comprising:
a sensor configured to measure the position of the first object or the object;
wherein the display control apparatus generates the control information based on the position of the first object or the object.

18. The display system of claim 15, further comprising:
a camera configured to capture an image including an eye of the driver;
wherein the display control apparatus generates the control information based on the image.

19. The display system of claim 15, wherein the support image is hidden while a second object is present within the field of view of the driver.

20. The display system of claim 15, wherein a display form of the marker image changes in accordance with a relative positional relationship between the moveable body and the object.

21. The display system of claim 15, wherein when the object moves out of the field of view of the driver, the display apparatus is configured to display a suggestion image within the field of view of the driver, the suggestion image suggesting the presence of the object outside of the field of view of the driver.

22. The display system of claim 7, wherein the a projection-target member configured to receive and scatter light or to receive and emit light and
the image projector emits image projection light that projects an image and to form the image as a real image on the projection-target member.

* * * * *